(12) United States Patent
Mishima

(10) Patent No.: US 9,843,694 B2
(45) Date of Patent: Dec. 12, 2017

(54) IMAGE READING DEVICE AND METHOD, READING AREA DISPLAY DEVICE AND METHOD, AND PROGRAM

(71) Applicant: FUJIFILM Corporation, Tokyo (JP)

(72) Inventor: Takahiro Mishima, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/462,486

(22) Filed: Mar. 17, 2017

(65) Prior Publication Data

US 2017/0195519 A1    Jul. 6, 2017

Related U.S. Application Data

(63) Continuation of application No. PCT/JP2015/077334, filed on Sep. 28, 2015.

(30) Foreign Application Priority Data

Sep. 30, 2014  (JP) ................................ 2014-200464

(51) Int. Cl.
    *H04N 1/00*     (2006.01)
    *G06K 9/32*     (2006.01)

(52) U.S. Cl.
    CPC ....... *H04N 1/00801* (2013.01); *G06K 9/3233* (2013.01); *H04N 1/00013* (2013.01);
    (Continued)

(58) Field of Classification Search
    None
    See application file for complete search history.

(56) References Cited

U.S. PATENT DOCUMENTS 6,323,876 B1 *  11/2001  Rao ................... G06K 9/00442
                                                         345/634
6,711,293 B1     3/2004  Lowe
                         (Continued)

FOREIGN PATENT DOCUMENTS

JP    H 04-092559 A    3/1992
JP    2000-099705 A    4/2000
                       (Continued)

OTHER PUBLICATIONS

International Search Report (ISR) (PCT Form PCT/ISA/210), in PCT/JP2015/077334, dated Nov. 24, 2015.
(Continued)

*Primary Examiner* — Scott A Rogers
(74) *Attorney, Agent, or Firm* — Mcginn IP Law Group, PLLC

(57) ABSTRACT

In a preferred aspect of the present invention, manuscript image data is analyzed, and a feature amount to be used for specifying a positional relationship between the manuscript image data and read image data of a printed material read by a reading unit that performs reading of the printed material on which an image is printed on the basis of the manuscript image data, is detected. At least one or more areas including the feature amount in the manuscript image data is set as a reading area. A setting position of the printed material with respect to the reading unit is displayed on the basis of a result of the setting of the reading area. Reading of the printed material set in the reading unit is performed after the setting position is displayed by a display unit.

15 Claims, 14 Drawing Sheets

(52) U.S. Cl.
CPC ..... *H04N 1/00023* (2013.01); *H04N 1/00039* (2013.01); *H04N 1/0044* (2013.01); *H04N 1/00076* (2013.01); *H04N 1/00082* (2013.01); *H04N 1/00809* (2013.01); *H04N 1/00811* (2013.01); *H04N 1/00816* (2013.01); *H04N 1/00824* (2013.01); *H04N 2201/0081* (2013.01)

(56) References Cited

U.S. PATENT DOCUMENTS

| | | | |
|---|---|---|---|
| 6,788,817 B1 * | 9/2004 | Saka | G06K 9/3241 |
| | | | 382/190 |
| 6,975,434 B1 * | 12/2005 | Pilu | H04N 1/0402 |
| | | | 358/450 |
| 7,505,182 B2 * | 3/2009 | Suzuki | G03G 15/50 |
| | | | 358/1.13 |
| 8,913,285 B1 * | 12/2014 | Neubrand | H04N 1/3873 |
| | | | 358/1.9 |
| 9,369,607 B2 * | 6/2016 | Yabuuchi | H04N 1/3878 |
| 2005/0146760 A1 * | 7/2005 | Kim | H04N 1/00795 |
| | | | 358/538 |
| 2011/0134444 A1 * | 6/2011 | Lee | H04N 1/0044 |
| | | | 358/1.5 |
| 2017/0048401 A1 * | 2/2017 | Berke | H04N 1/0097 |
| 2017/0195503 A1 * | 7/2017 | Mishima | H04N 1/00087 |

FOREIGN PATENT DOCUMENTS

| | | |
|---|---|---|
| JP | 2007-013831 A | 1/2007 |
| JP | 2010-068381 A | 3/2010 |
| JP | 2012-160957 A | 8/2012 |
| JP | 2013-030996 A | 2/2013 |

OTHER PUBLICATIONS

Written Opinion of the ISA/JPO (PCT/ISA/237) in PCT/JP2015/077334, dated Nov. 24, 2015 and English translation thereof.

* cited by examiner

FIG. 16A

| FIRST EDGE TOTALING DATA | | ~100
|---|---|
| | NUMBER OF BLOCKS HAVING STRAIGHT LINE |
| FIRST CANDIDATE AREA | 11 |
| SECOND CANDIDATE AREA | 7 |
| THIRD CANDIDATE AREA | 10 |
| FOURTH CANDIDATE AREA | 8 |

FIG. 16B

| SECOND EDGE TOTALING DATA | | ~101
|---|---|
| | LENGTH OF STRAIGHT LINE |
| FIRST CANDIDATE AREA | 4 |
| SECOND CANDIDATE AREA | 5 |
| THIRD CANDIDATE AREA | 3 |
| FOURTH CANDIDATE AREA | 3 |

FIG. 16C

| THIRD EDGE TOTALING DATA | | ~102
|---|---|
| | MAXIMUM NUMBER OF LINE SEGMENTS IN BLOCK |
| FIRST CANDIDATE AREA | 4 |
| SECOND CANDIDATE AREA | 3 |
| THIRD CANDIDATE AREA | 2 |
| FOURTH CANDIDATE AREA | 5 |

IMAGE READING DEVICE AND METHOD, READING AREA DISPLAY DEVICE AND METHOD, AND PROGRAM

CROSS-REFERENCE TO RELATED APPLICATIONS

This application is a Continuation of PCT International Application No. PCT/JP2015/077334 filed on Sep. 28, 2015, which claims priority under 35 U.S.C. §119(a) to Japanese Patent Application No. 2014-200464 filed on Sep. 30, 2014. Each of the above applications is hereby expressly incorporated by reference, in their entirety, into the present application.

BACKGROUND OF THE INVENTION

1. Field of the Invention

The present invention relates to an image reading device and an image reading method that are used for reading of a printed material, a reading area display device, a reading area display method, and a program.

2. Description of the Related Art

In the field of printing, a correspondence relationship between colors of manuscript image data and a printed material on which an image has been printed on the basis of manuscript image data is obtained in order to evaluate color reproduction of the printed material on which the image has been printed on the basis of the manuscript image data. This correspondence relationship is obtained by comparing color information of the manuscript image data with color information of read image data obtained by reading the printed material using a scanner (reading unit).

In recent years, in a case where reading of a printed material is performed using a scanner, a size of the printed material may be larger than a reading range (also referred to as a reading area) in which the printed material can be read by the scanner. In this case, generally, the printed material is divided into a plurality of areas, each area is read by the scanner to acquire area read image data for each area, and then pieces of the area read image data are combined to obtain read image data of the entire printed material.

JP2012-160957A discloses an image reading device that compares degrees of inclination between area image data read for the first time and area image data read for the second time and subsequent times to prevent a blank portion from being generated in an image based on the read image data after combination.

JP2010-068381A discloses an image reading device that combines area read image data for each area using a cover sheet on which a grid indicating position information of the plurality of areas described above is printed with a dropout color. The image reading device of JP2010-068381A performs switching between two types of illumination lights with which an image including a dropout color and an image not including the dropout color can be acquired when causing the cover sheet to overlap the printed material and then reading each area using a scanner. Thus, the image reading device of JP2010-068381A can acquire area read image data for each area including the grid printed with the dropout color and area read image data for each area not including the grid. The image reading device of JP2010-068381A combines the area read image data of each area not including the grid on the basis of the position information acquired from the area read image data of each area including the grid to obtain the read image data of the entire printed material.

According to this image reading device described in JP2012-160957A and JP2010-068381A, even in a case where a size of the printed material is larger than the reading range of the scanner, the printed material is divided into a plurality of areas and each area is read by the scanner so as to obtain read image data of the entire printed material. Thus, it is possible to analyze the read image data of the printed material to obtain color information, and a correspondence relationship between colors of the manuscript image data and the printed material is obtained by comparing color information of the read image data with color information of the manuscript image data.

SUMMARY OF THE INVENTION

However, the correspondence relationship between the colors of the manuscript image data and the printed material can be obtained from the color information of read image data (the above-described area read image data) of an area of a portion of the printed material without obtaining the color information of the read image data of the entire printed material. Therefore, it is not necessary to obtain the read image data of the entire printed material unlike the image reading device described in JP2012-160957A and JP2010-068381A, and conversely, efforts or time is required to obtain the read image data of the entire printed material.

Further, in the image reading device described in JP2010-068381A, since the cover sheet on which the grid of drop out color has been printed is used, printed material information immediately under the grid is highly likely to be missing from the read image data. Further, when the cover sheet overlaps a thick printed material, a gap is generated between the printed material and the cover sheet and accurate position information may not be obtained.

Therefore, in a case where a correspondence relationship between colors of the manuscript image data and the printed material is established, it is preferable for an optimum reading area of a portion of the printed material suitable for establishment of the correspondence relationship between colors to be read by a scanner and for color information of read image data of the scanner to be obtained. However, the optimum reading area may not be necessarily easily discriminated from the image printed on the printed material, and in some cases, it is necessary to repeat reading in the scanner several times while changing the reading area. Further, an area including a primary subject (a product, a person, or the like) rather than a background in an image printed on the printed material or a surrounding margin portion (solid image portion) is usually selected as the optimum reading area, but a position of the primary subject in the image is different according to a printed material. As a result, it is necessary to change the optimum reading area according to a printed material, and it is not possible to simply determine the optimum reading area.

The present invention has been made in view of such circumstances, and an object thereof is to provide an image reading device and method capable of efficiently performing reading of a printed material, a reading area display device and method, and a program.

In order to achieve the object of the present invention, there is provided an image reading device according to an aspect of the invention, the device comprising: a reading unit that performs reading of a printed material on which an image is printed on the basis of manuscript image data; an image analysis unit that analyzes the manuscript image data and detects a feature amount to be used for specifying a positional relationship between the manuscript image data and read image data of the printed material read by the reading unit; a reading area setting unit that sets a reading area in which the reading unit performs reading of the printed material, on the basis of the feature amount detected by the image analysis unit, and sets at least one or more areas including the feature amount in the manuscript image data as the reading area; and a display unit that displays a setting position of the printed material with respect to the reading unit on the basis of a result of the setting of the reading area by the reading area setting unit, wherein the reading unit performs reading of the printed material set in the reading unit after the setting position is displayed by the display unit.

According to the present invention, it is possible to indicate a reading area including the feature amount to be used for specifying a positional relationship between the manuscript image data and the read image data in the manuscript image data to the user. Accordingly, it is not necessary for the reading by the reading unit to be repeated several times while changing the reading area of the printed material, and it is possible to perform reading of the reading area including the above-described feature amount in a short time (about once).

In the image reading device according to another aspect of the present invention, the reading unit performs reading of the printed material that is larger than a reading range in which the reading unit is capable of reading the printed material. Thus, when the reading unit performs reading of the printed material larger than the reading range, it is possible to indicate a reading area including the above-described feature amount in the manuscript image data to the user.

In the image reading device according to still another aspect of the present invention, the display unit displays the setting position to be overlapped on a reduced image generated on the basis of the manuscript image data. Thus, it is possible to indicate a reading area including the above-described feature amount in the manuscript image data to the user.

In the image reading device according to still another aspect of the present invention, the display unit selects and displays an area corresponding to the reading area in an image based on the manuscript image data. Thus, it is possible to indicate a reading area including the above-described feature amount in the manuscript image data to the user.

In the image reading device according to still another aspect of the present invention, the image analysis unit analyzes edge image data generated on the basis of the manuscript image data, and detects a feature shape of the image to be used for specifying the positional relationship as the feature amount from the edge image data. Accordingly, it is possible to automatically detect the above-described feature amount.

In the image reading device according to still another aspect of the present invention, the image analysis unit detects a straight edge as the feature shape. Accordingly, it is possible to automatically set the reading area including the above-described feature amount in the manuscript image data.

In the image reading device according to still another aspect of the present invention, the reading area setting unit sets a plurality of candidate areas that are candidates of the reading area in the manuscript image data, and sets an area including at least the feature amount detected by the image analysis unit among the plurality of the candidate area, as the reading area. Accordingly, it is possible to automatically set the reading area including the above-described feature amount in the manuscript image data.

In the image reading device according to still another aspect of the present invention, the reading area setting unit sets an area including the most feature amount detected by the image analysis unit among a plurality of candidate areas as the reading area. Accordingly, it is possible to set an optimum candidate area among the plurality of candidate areas as the reading area.

The image reading device according to still another aspect of the present invention further comprises: a registration unit that performs a registration process of specifying a positional relationship between the read image data read by the reading unit and the manuscript image data after reading of the printed material in the reading unit; and a color extraction unit that acquires color information from a corresponding image position of the read image data and the manuscript image data and obtains a correspondence relationship between color information of the read image data and color information of the manuscript image data. Accordingly, a correspondence relationship between color information of the read image data and color information of the manuscript image data is obtained.

An image reading method for achieving the object of the present invention is an image reading method of performing reading of a printed material using a reading unit that performs reading of a printed material on which an image is printed on the basis of manuscript image data, the image reading method comprising: an image analysis step of analyzing the manuscript image data and detecting a feature amount to be used for specifying a positional relationship between the manuscript image data and read image data of the printed material read by the reading unit; a reading area setting step of setting a reading area in which the reading unit performs reading of the printed material, on the basis of the feature amount detected in the image analysis step, and setting at least one or more areas including the feature amount in the manuscript image data as the reading area; a display step of displaying a setting position of the printed material with respect to the reading unit on the basis of a result of the setting of the reading area in the reading area setting step; and a reading step of performing reading of the printed material set in the reading unit after the setting position is displayed in the display step.

A reading area display device for achieving the object of the present invention is a reading area display device that displays a reading area of a printed material when reading of the printed material is performed by a reading unit that performs reading of a printed material on which an image is printed on the basis of manuscript image data, the reading area display device comprising: an image analysis unit that analyzes the manuscript image data and detects a feature amount to be used for specifying a positional relationship between the manuscript image data and read image data of the printed material read by the reading unit; a reading area setting unit that sets a reading area in which the reading unit performs reading of the printed material, on the basis of the feature amount detected by the image analysis unit, and sets at least one or more areas including the feature amount in the manuscript image data as the reading area; and a display unit that displays a setting position of the printed material with respect to the reading unit on the basis of a result of the setting of the reading area by the reading area setting unit.

A reading area display method for achieving the object of the present invention is a reading area display method of displaying a reading area of a printed material when reading of the printed material is performed by a reading unit that performs reading of a printed material on which an image is printed on the basis of manuscript image data, the reading area display method comprising: an image analysis step of analyzing the manuscript image data and detecting a feature amount to be used for specifying a positional relationship between the manuscript image data and read image data of the printed material read by the reading unit; a reading area setting step of setting a reading area in which the reading unit performs reading of the printed material, on the basis of the feature amount detected in the image analysis step, and setting at least one or more areas including the feature amount in the manuscript image data as the reading area; and a display step of displaying a setting position of the printed material with respect to the reading unit on the basis of a result of the setting of the reading area in the reading area setting step.

A program for achieving the object of the present invention is a program for causing a computer to function as means for displaying a reading area of a printed material when reading of the printed material is performed by a reading unit that performs reading of the printed material on which an image is printed on the basis of manuscript image data, the program causing the computer to function as: an image analysis unit that analyzes the manuscript image data and detects a feature amount to be used for specifying a positional relationship between the manuscript image data and read image data of the printed material read by the reading unit; a reading area setting unit that sets a reading area in which the reading unit performs reading of the printed material, on the basis of the feature amount detected by the image analysis unit, and sets at least one or more areas including the feature amount in the manuscript image data as the reading area; and a display unit that displays a setting position of the printed material with respect to the reading unit on the basis of a result of the setting of the reading area by the reading area setting unit. A computer-readable medium having this program recorded thereon is also included in the present invention.

According to the image reading device and method, the reading area display device and method, and the program of the present invention, it is possible to efficiently perform reading of the printed material.

BRIEF DESCRIPTION OF THE DRAWINGS

FIGS. 16A to 16C are illustrative diagrams illustrating examples of first edge totaling data, second edge totaling data, and third edge totaling data, respectively.

DESCRIPTION OF THE PREFERRED EMBODIMENTS

[Configuration of Image Reading Device According to First Embodiment]

Figure 1:
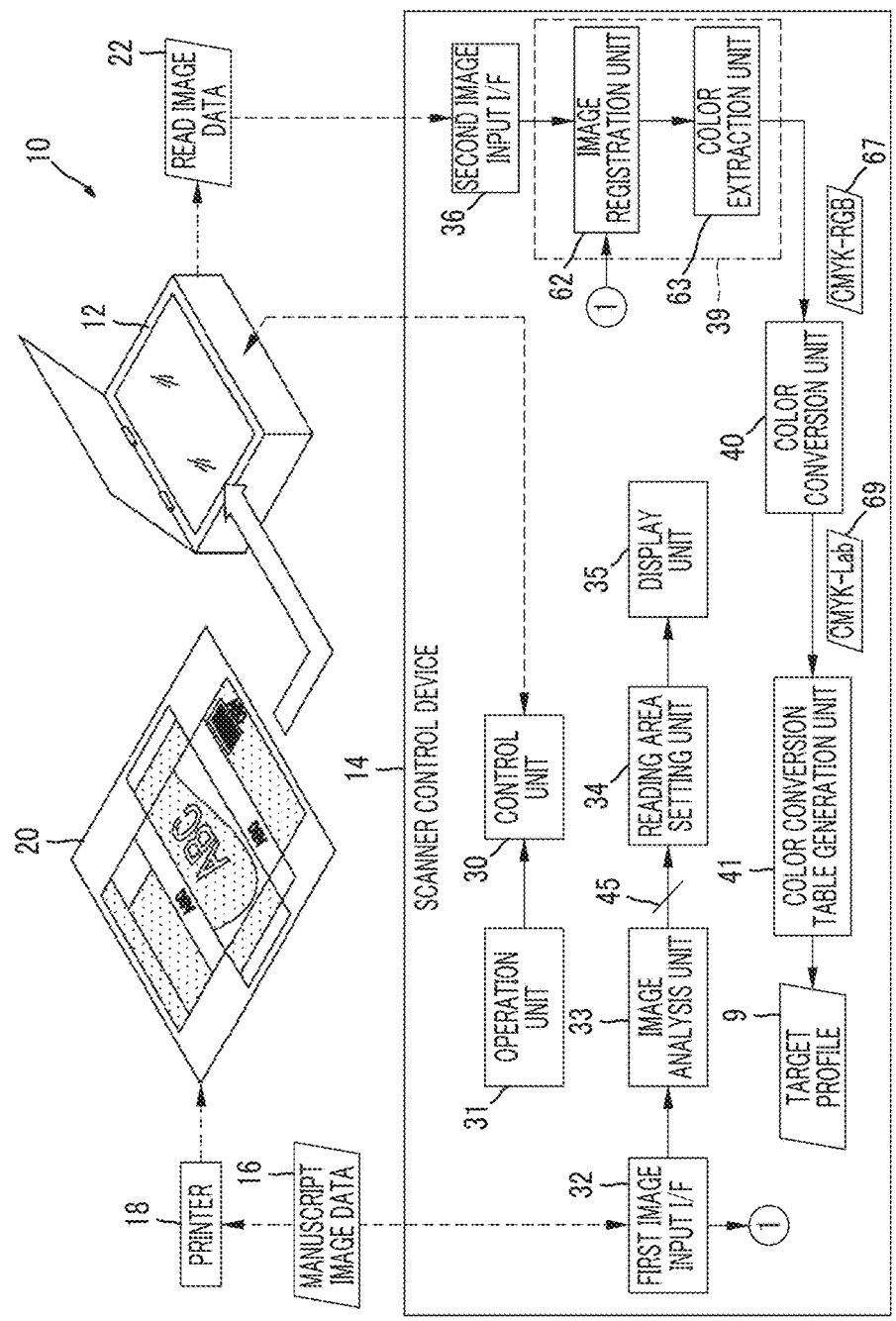
FIG. 1 is a schematic diagram illustrating an entire configuration of an image reading device.

FIG. 1 is a schematic diagram illustrating an entire configuration of an image reading device 10. As illustrated in FIG. 1, the image reading device 10 roughly includes a scanner 12 corresponding to a reading unit of the present invention, and a scanner control device 14 corresponding to a reading area display device of the present invention. In the image reading device 10, the scanner 12 reads a printed material 20 on which an image is printed on the basis of manuscript image data 16 by a printer 18, and the scanner control device 14 generates a target profile 9 using a result of the reading. The manuscript image data 16 is image data of C (cyan) M (magenta) Y (yellow) K (black). Further, for a printing format of the printed material 20 by the printer 18, various printing schemes such as an inkjet printing scheme or a flexographic printing scheme can be adopted.

A target profile 9 is also referred to as an "objective profile" or an "input profile". The target profile 9 is a color conversion table describing a CMYK→Lab conversion relationship in which a target color of a CMYK signal of a device-dependent color space of manuscript image data 16 is defined in a device-independent color space (here, a Lab space).

Under the control of the scanner control device 14, the scanner 12 performs reading (also referred to as scan) of a printed material 20 on which an image has been printed on the basis of manuscript image data 16 to generate and outputs read image data 22 of the printed material 20. The read image data 22 is image data of R (red) G (green) B (blue). Further, in FIG. 1, an example of the scanner 12 may include a stationary scanner, but various known types of scanners may be used.

A size of the printed material 20 is formed to be larger than a reading range in which the printed material is readable in a reading surface (glass surface) of the scanner 12. Therefore, an area of a portion of the printed material 20 is selected and set on the reading surface of the scanner 12. The read image data 22 obtained through one reading in the scanner 12 is read image data corresponding to the area of the portion of the printed material 20.

<Configuration of Scanner Control Device>

The scanner control device 14 includes, for example, a personal computer and a monitor. The scanner control device 14 controls reading of the printed material 20 by the scanner 12, and performs a display of the reading area when the scanner 12 reads the printed material 20. Further, the scanner control device 14 performs an association process between the manuscript image data 16 and the read image data 22, that is, a registration process of specifying a positional relationship between the manuscript image data 16 and the read image data 22, and performs generation of the target profile 9 on the basis of a result of the registration process.

The scanner control device 14 includes a control unit 30, an operation unit 31, a first image input I/F (interface) 32, an image analysis unit 33, a reading area setting unit 34, a display unit 35, a second image input I/F 36, an image association unit 39, a color conversion unit 40, and a color conversion table generation unit 41.

For the control unit 30, for example, a central processing unit (CPU) or the like is used. The control unit 30 appropriately executes a program read from a memory (not illustrated) or the like according to an input instruction of the operation unit 31, to control an operation of each unit of the scanner control device 14 and a reading operation of the scanner 12. As the operation unit 31, for example, a keyboard, a mouse, an operation key, a touch panel, or the like may be used.

The first image input I/F 32 functions as an image acquisition unit that acquires the manuscript image data 16 from the outside of the image reading device 10. For example, in a case where the manuscript image data 16 is recorded on an information recording medium such as a memory card, a reading I/F is used as the first image input I/F 32. Further, in a case where the manuscript image data 16 is stored in a server on a network, various storage units, or the like, a communication I/F is used as the first image input I/F 32.

<Manuscript Image Data>

The first image analysis unit 33 performs analysis of the manuscript image data 16 input from the first image input I/F 32 to detect a feature amount that is used for a registration process of specifying a positional relationship between the manuscript image data 16 and the read image data 22 from the manuscript image data 16. This feature amount is registration information that is used for the above-described registration process. In this embodiment, the feature amount is a feature shape of an image that is used for a geometric conversion process of matching at least one of the manuscript image data 16 and the read image data 22 to the other. The image analysis unit 33 in this embodiment detects a straight edge of the image as the feature shape of the image suitable for the registration process.

Specifically, the image analysis unit 33 analyzes the manuscript image data 16 to detect the presence or absence of a straight edge, a length thereof, and a position thereof, and generates feature shape image data 45 indicating a result of the detection. This feature shape image data 45 is used for setting of a reading area when reading of the printed material 20 is performed by the scanner 12, in the reading area setting unit 34 to be described below. Hereinafter, a process of generating the feature shape image data 45 that the image analysis unit 33 generates by analyzing the manuscript image data 16 will be described.

Figure 2:
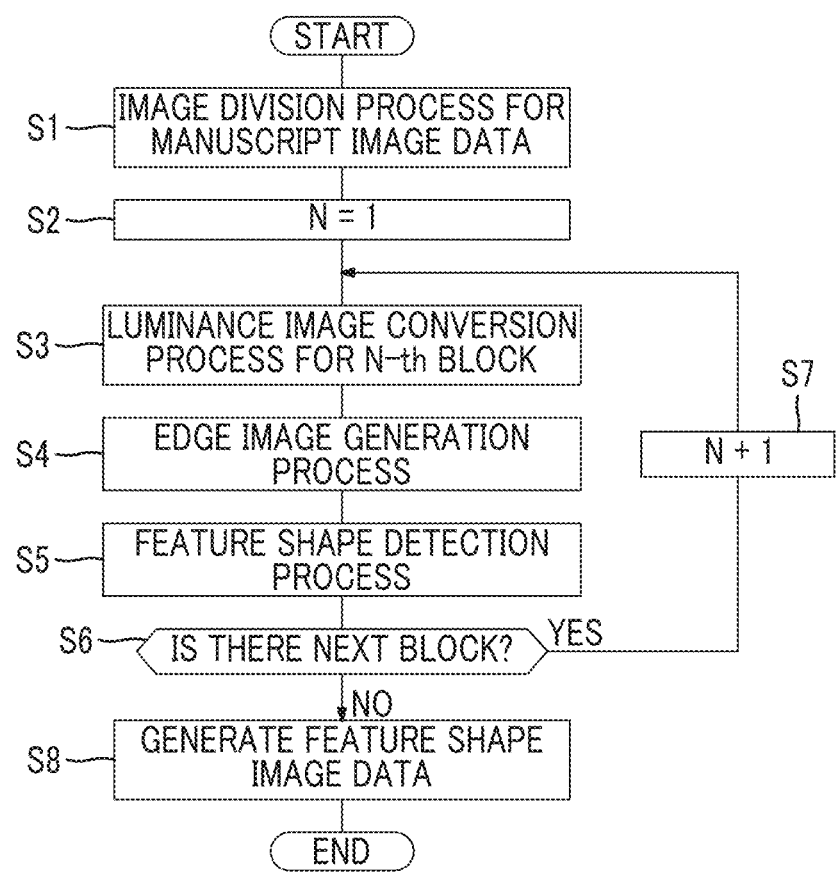
FIG. 2 is a flowchart illustrating a flow of a process of generating feature shape image data by an image analysis unit.

FIG. 2 is a flowchart illustrating a flow of a process of generating the feature shape image data 45 in the image analysis unit 33. As illustrated in FIG. 2, the process of generating the feature shape image data 45 roughly includes an image division process (step S1), a luminance image conversion process (steps S2 and S3), an edge image generation process (step S4), and a feature shape detection process (step S5). The feature shape image data 45 is generated by repeatedly executing each process (steps S6, S7, and S8).

Figure 3:
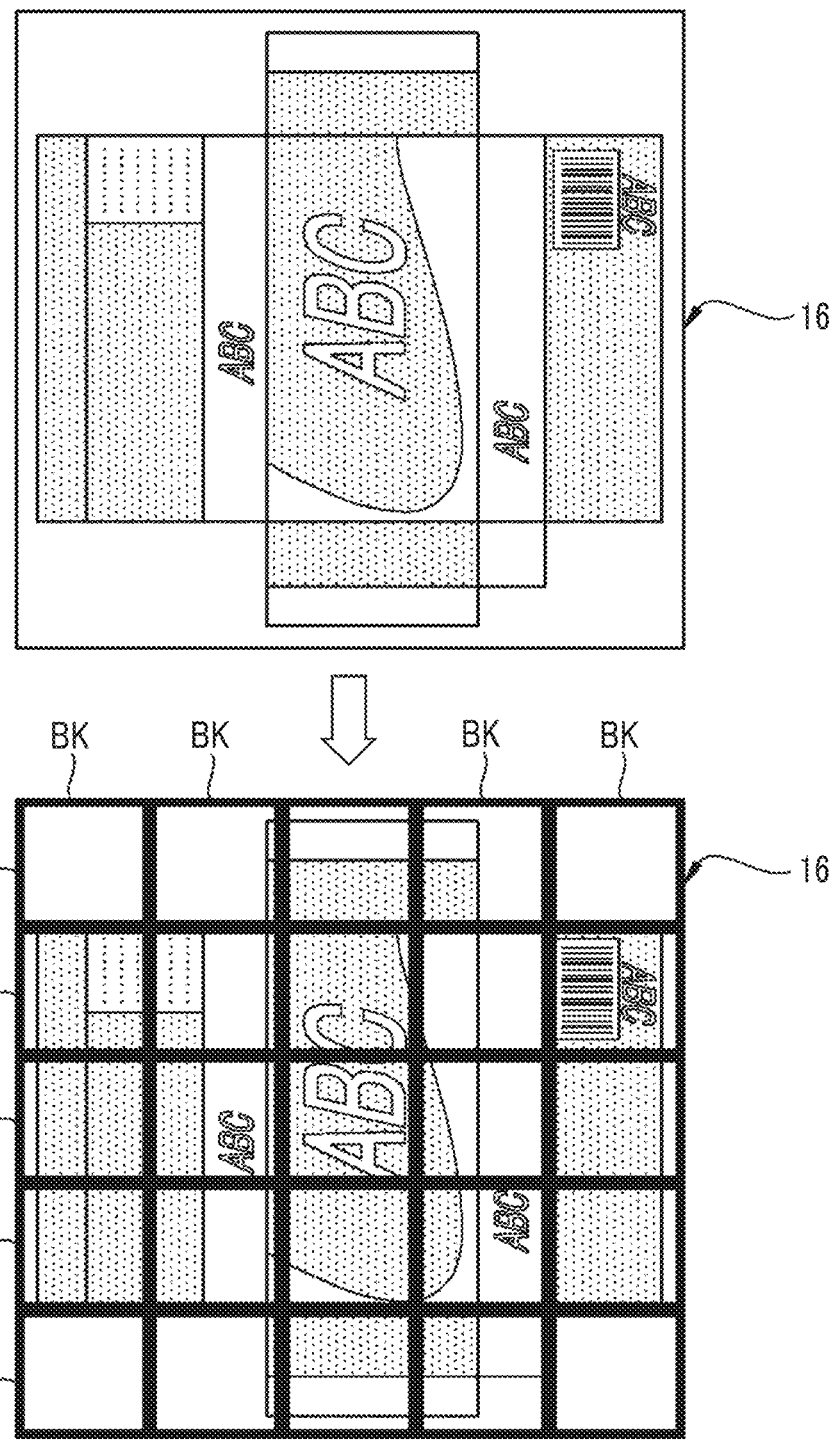
FIG. 3 is an illustrative diagram illustrating an image division process.

FIG. 3 is a diagram illustrating the image division process. As illustrated in FIG. 3, the image analysis unit 33 performs an image division process of dividing the manuscript image data 16 shown at an upper end of FIG. 3 into a plurality of blocks BK in a grid shape as shown at a lower end of FIG. 3 (step S1 in FIG. 2). Here, the division includes not only actual division of the manuscript image data 16, but also virtual division.

Each block BK is a rectangular area, and a size thereof is appropriately determined according to a maximum reading range of the scanner 12, a size of the printed material 20, or the like. For example, in this embodiment, the size of each block BK is determined so that a size in which the blocks BK are arranged side by side in m×n (m and n are arbitrary natural numbers) in vertical and horizontal directions in FIG. 3 is same as the maximum reading range (a candidate area to be described below) of the scanner 12 (see FIG. 7). The block BK is not limited to the rectangular area and may be changed into another shape, such as a circular area.

Figure 4:
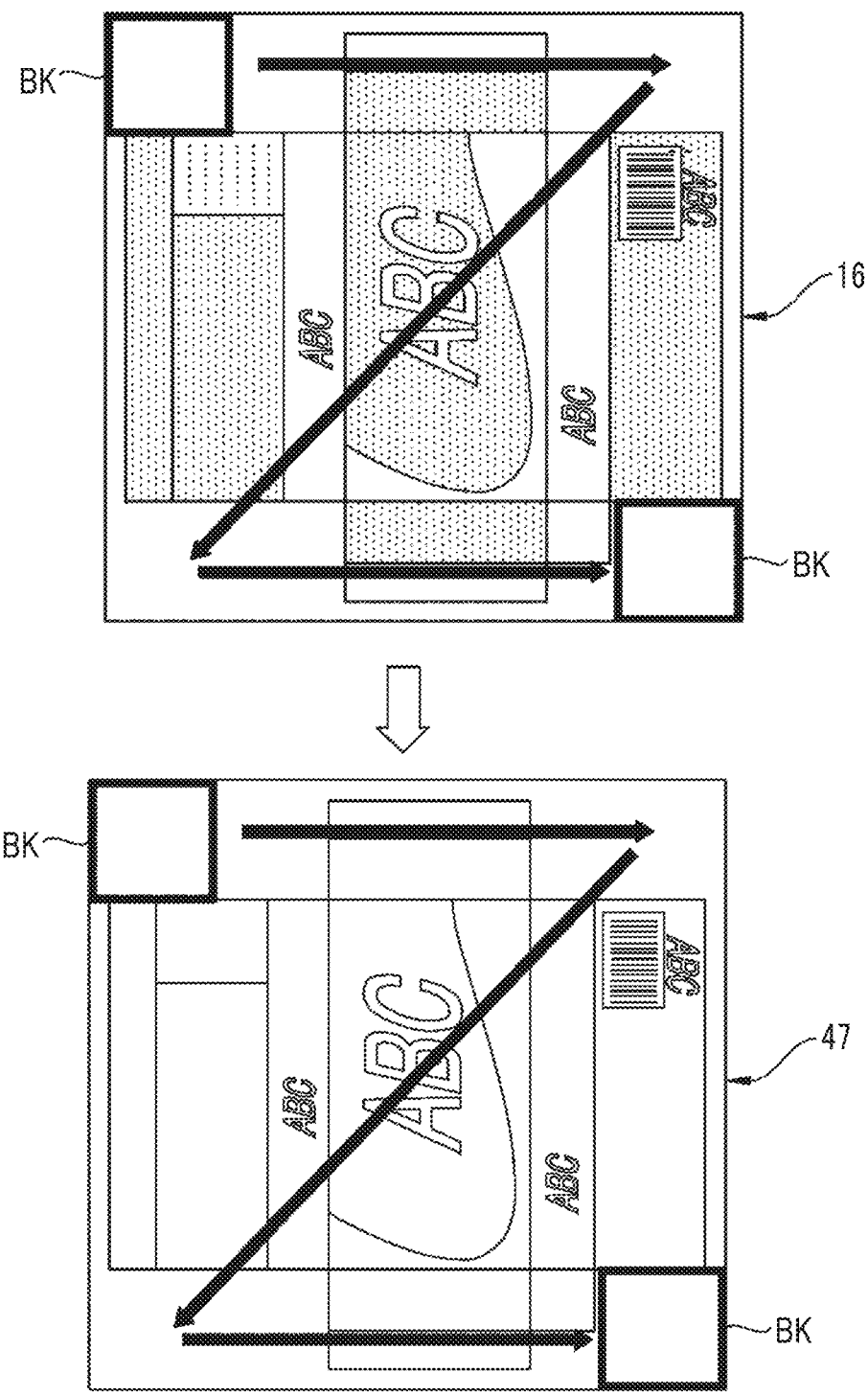
FIG. 4 is an illustrative diagram illustrating a luminance image conversion process and an edge image generation process.

FIG. 4 is an illustrative diagram illustrating the luminance image conversion process and the edge image generation process. As illustrated at an upper end of FIG. 4, the image analysis unit 33 sets the block BK located, for example, at an upper left corner of the manuscript image data 16 in FIG. 4 as a first block BK (step S2 in FIG. 2). The image analysis unit 33 performs the luminance image conversion process of converting CMYK image data in the first block BK into luminance image data by extracting a luminance component from a CMYK signal of each pixel in the first block BK and obtaining luminance for each pixel (step S3 in FIG. 2). Since a method of the luminance image conversion process is well known, detailed description thereof will be omitted.

Then, as illustrated at a lower end of FIG. 4, the image analysis unit 33 performs edge detection on the luminance image data in the first block BK and performs the edge image generation process of generating edge image data 47 (step S4 in FIG. 2). The edge detection is performed using, for example, a Canny filter, a Sobel filter, or a Lapracian filter, but preferably, may be performed using the Canny filter capable of detecting an edge with high accuracy. Further, when this edge is detected, it is preferable for the detection to be performed by removing a short line segment of less than several tens of pixels. By performing the edge detection in this manner, a straight edge that is a feature shape of the image can be detected from the manuscript image data 16.

Figure 5:
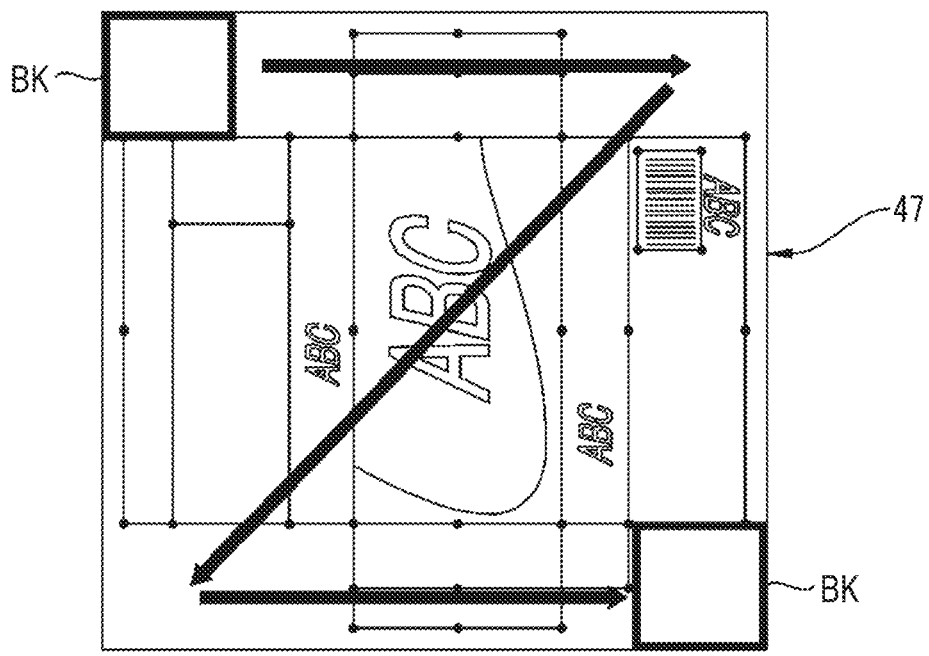
FIG. 5 is an illustrative diagram illustrating a feature shape detection process.

FIG. 5 is an illustrative diagram illustrating the feature shape detection process. As illustrated in FIG. 5, the image analysis unit 33 performs a feature shape detection process of detecting presence or absence of a straight edge in the block BK from the edge image data 47 in the first block BK, and also detecting a length and a position of the straight edge in a case where the straight edge is detected (step S5 in FIG. 2). Here, as a method of detecting the straight edge from the edge image data 47, a well-known straight line detection method based on Hough transformation or the like is used. In FIG. 5, a "black circle" is added to straight edges having a length equal to or greater than a certain length detected by the image analysis unit 33.

Referring back to FIG. 2, the image analysis unit 33 performs the luminance image conversion process, the edge image generation process, and the feature shape detection process described above, for example, on the CMYK image data in the second block BK adjacent to the first block BK on the manuscript image data 16 (YES in step S6, step S7, and steps S3 to S5). Accordingly, presence or absence, a length, and a position of the straight edge are detected for the second block BK.

Hereinafter, similarly, the image analysis unit 33 scans all the areas of the manuscript image data 16 while changing the position of the block BK, and repeatedly executes the process of steps S3 to S5 described above for the CMYK image data in all the blocks BK (NO in step S6). Arrows in FIGS. 3 to 5 described above schematically indicate a state in which all the areas are scanned while changing the position of the block BK.

After completion of scanning of all the areas, the image analysis unit 33 generates the feature shape image data 45 on the basis of a result of detection of the presence or absence, the length, and the position of the straight edge for each block BK (step S8). Although the edge image data 47 is generated for each block BK and the detection of the feature shape (detection of the straight edge) is performed in this embodiment, the edge image data 47 may be generated in the entire manuscript image data 16, and then, the detection of the feature shape may be performed for each block BK.

Figure 6:
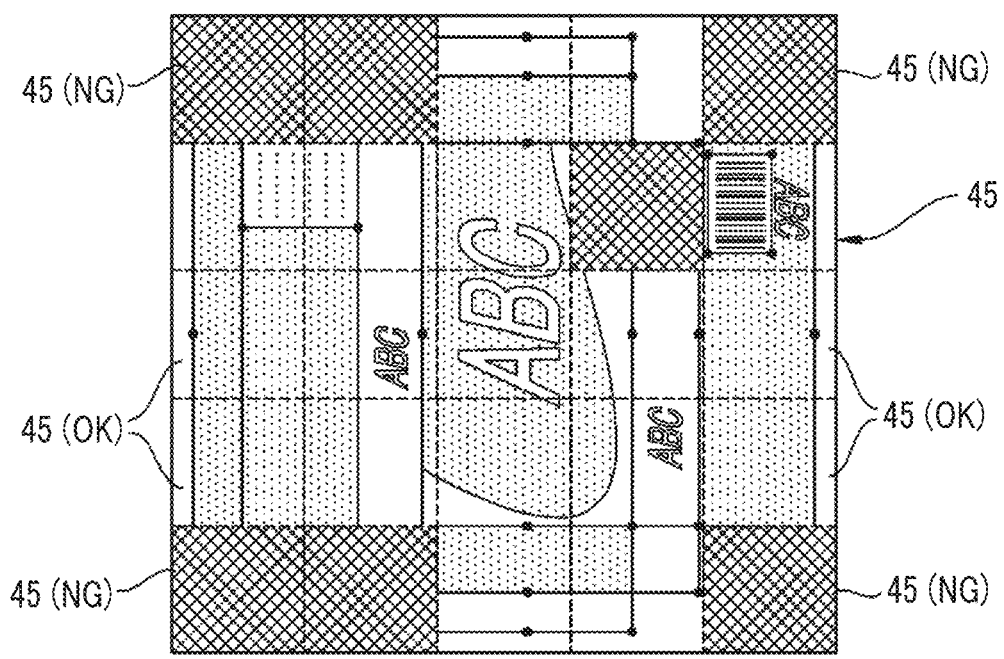
FIG. 6 is an illustrative diagram illustrating feature shape image data.

FIG. 6 is an illustrative diagram illustrating the feature shape image data 45. As illustrated in FIG. 6, the feature shape image data 45 indicates a result of the detection of presence or absence, a length, or a position of the straight edge for each block BK obtained through the analysis of the manuscript image data 16 in the image analysis unit 33 descried above. The feature shape image data 45 is divided in units of blocks BK described above (including virtual division). This feature shape image data 45 includes valid block image data 45 (OK) and invalid block image data 45 (NG).

The valid block image data 45 (OK) is block image data that can be used as registration information that is used for the registration process between the manuscript image data 16 and the read image data 22. The image analysis unit 33 determines whether the valid block image data 45 (OK) satisfies a predetermined criterion that can be used as registration information, for each block BK, on the basis of a result of the detection of presence or absence, a length, and a position of the straight edge of each block BK. The image analysis unit 33 regards the block image data of the block BK satisfying the predetermined criterion as the valid block image data 45 (OK). An example of this predetermined criterion may include inclusion of a straight edge equal to or greater than a certain length, inclusion of a plurality of edges intersecting with one another, or inclusion of a plurality of edges densely gathered above a certain number. This predetermined criterion may be changed into a desired reference by the user.

The invalid block image data 45 (NG) is block image data that cannot be used as registration information, unlike the valid block image data 45 (OK). The image analysis unit 33 regards the block image data corresponding to the block BK that do not satisfy the above-described predetermined criterion as the invalid block image data 45 (NG). In the figure, in order to facilitate identification of the invalid block image data 45 (NG) in the feature shape image data 45, an area corresponding to the invalid block image data 45 (NG) is mask-displayed by shaded lines, but this identification method is not particularly limited.

Thus, the generation of the feature shape image data 45 that is a result of the analysis of the manuscript image data 16 ends. It is possible to discriminate an area suitable for the above-described registration process in the manuscript image data 16 by referring to the feature shape image data 45. The image analysis unit 33 outputs the manuscript image data 16 and the feature shape image data 45 to the reading area setting unit 34.

<Setting of Reading Area>

Referring back to FIG. 1, the reading area setting unit 34 a reading area when the reading of the printed material 20 is performed by the scanner 12 on the basis of the feature shape image data 45 input from the image analysis unit 33. This reading area is an area of the printed material 20 that is set on the reading surface of the scanner 12.

Specifically, the reading area setting unit 34 sets a plurality of candidate areas that are candidates of the reading area in the feature shape image data 45, and sets the candidate area including a largest number of pieces of valid block image data 45 (OK) among the candidate areas as the reading area.

Figure 7:
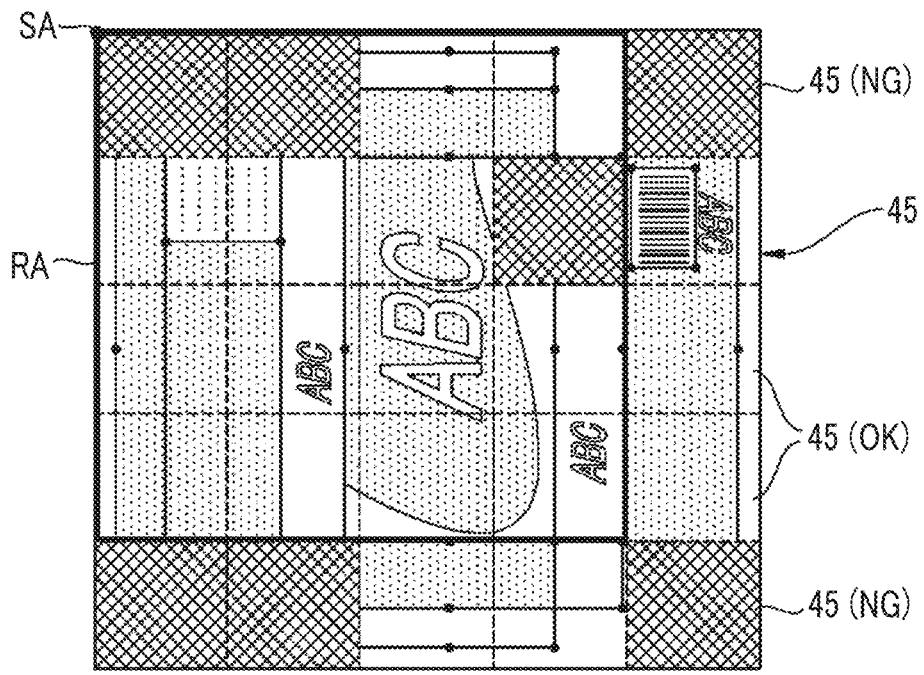
FIG. 7 is an illustrative diagram illustrating setting of a first candidate area by a reading area setting unit.

FIGS. 7 to 10 are illustrative diagrams illustrating setting of a reading area (candidate area) in the reading area setting unit 34. As illustrated in FIG. 7, the reading area setting unit 34 sets, in the feature shape image data 45, a first candidate area RA coming in contact with the outer periphery of the image based on the feature shape image data 45, using one (an upper left corner) of four corners of the image based on the feature shape image data 45 as a start point SA. Here, each candidate area including the first candidate area RA is set with a size of the reading surface that is a maximum reading size of the scanner 12. Further, each candidate area is set in an area in which the printed material 20 is not brought into contact with a hinge supporting a top plate of the scanner 12 and does not interfere with the set when the printed material 20 is set on the reading surface of the scanner 12, which is an area brought into contact with the outer periphery of the manuscript image. For the feature shape image data 45, the number of pieces of valid block image data 45 (OK) in the first candidate area RA is counted.

Although the reading area setting unit 34 in this embodiment sets the candidate area so that the candidate area is brought into contact with the outer periphery of the image based on the feature shape image data 45, data of an area finally removed from the printed material 20, such as a crop mark that is a marker indicating a reference position, is included in the feature shape image data 45. In this case, an area in contact with the outer periphery of a valid image in the image based on the feature shape image data 45 may be set as a candidate area.

Figure 8:
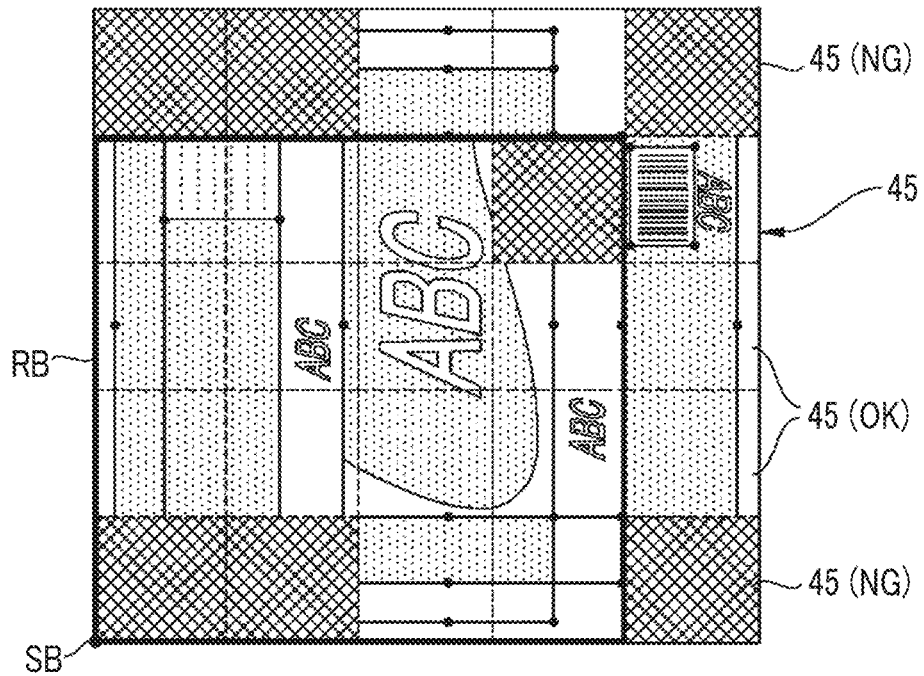
FIG. 8 is an illustrative diagram illustrating setting of a second candidate area by a reading area setting unit.

Then, as illustrated in FIG. 8, the reading area setting unit 34 sets the second candidate area RB in contact with the outer periphery of the image as the feature shape image data 45 using a lower-left corner of the image based on the feature shape image data 45 as a starting point SB, and then, counts the number of pieces of valid block image data 45 in the second candidate area RB (OK).

Figure 9:
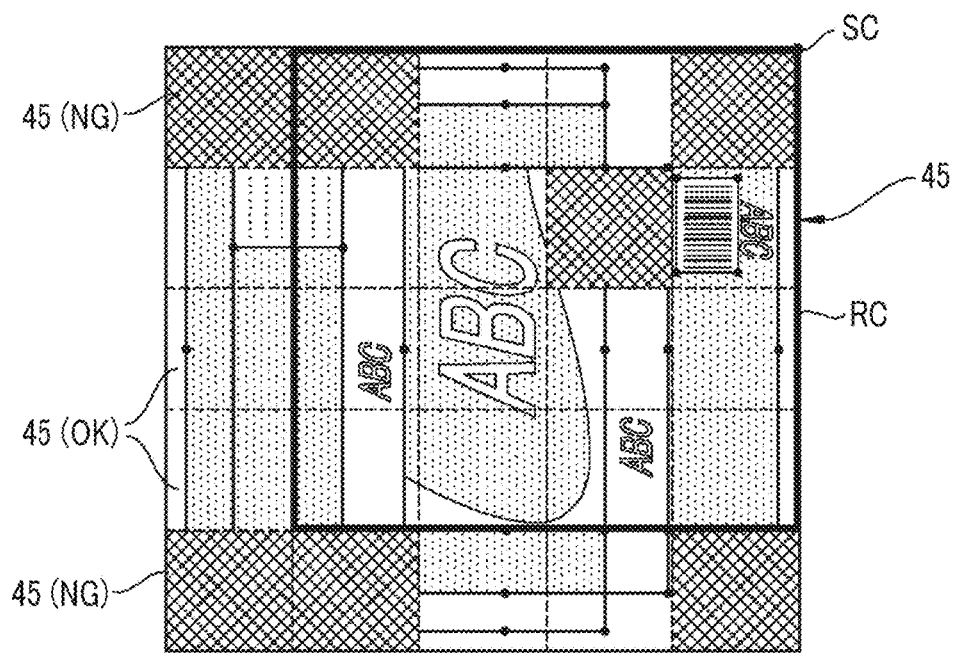
FIG. 9 is an illustrative diagram illustrating setting of a third candidate area by a reading area setting unit.
Figure 10:
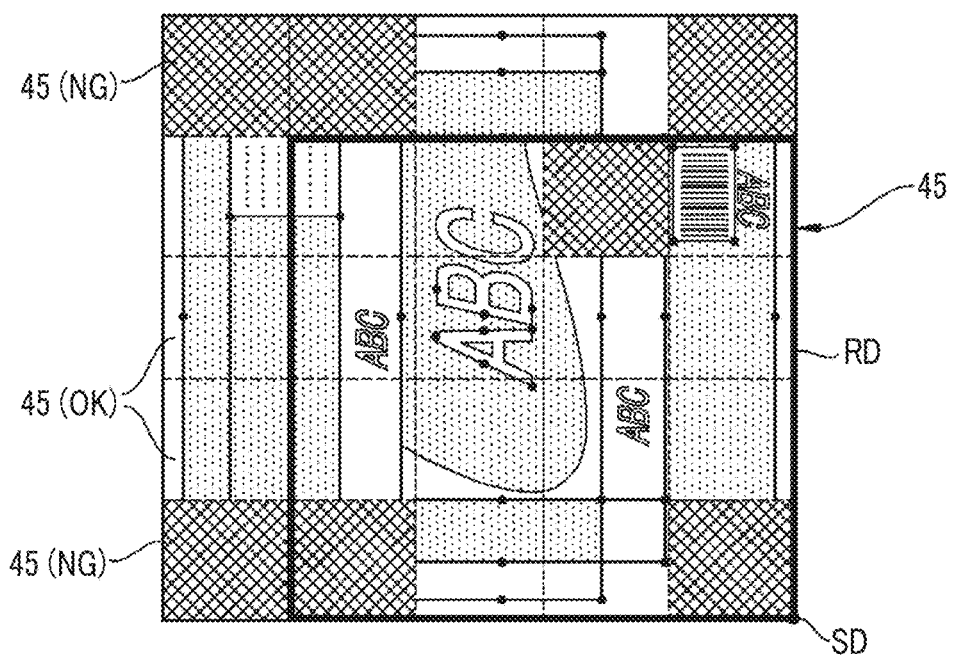
FIG. 10 is an illustrative diagram illustrating setting of a fourth candidate area by a reading area setting unit.

As illustrated in FIG. 9, the reading area setting unit 34 sets a third candidate area RC in contact with the outer periphery of the image as the feature shape image data 45 using an upper right corner of the image based on the feature shape image data 45 as a starting point SC, and then, counts the number of pieces of valid block image data 45 (OK) in the third candidate area RC. Then, as illustrated in FIG. 10, the reading area setting unit 34 sets a fourth candidate area RD in contact with the outer periphery of the image as the feature shape image data 45 using a lower right corner of the image based on the feature shape image data 45 as a starting point SD, and then, counts the number of pieces of valid block image data 45 (OK) in the fourth candidate area RD.

If the counting of the number of pieces of valid block image data 45 (OK) in the first candidate area RA to the fourth candidate area RD ends, the reading area setting unit 34 sets the candidate area including a largest number of pieces of valid block image data 45 (OK) among the respective candidate areas RA to RD as the reading area. Thereafter, the reading area setting unit 34 outputs a result of setting of the reading area to the display unit 35. Further, the reading area setting unit 34 outputs the manuscript image data 16 to the display unit 35.

Although the candidate area including a largest number of pieces of valid block image data 45 (OK) is set as the reading area in this embodiment, one or more candidate areas including at least the valid block image data 45 (OK) may be set as reading areas.

<Reading Area Display>

Referring back to FIG. 1, the display unit 35 displays reading area display screen 50 (see FIG. 11) indicating a setting position of the printed material 20 with respect to the scanner 12, that is, the reading area of the printed material 20 on the basis of the manuscript image data 16 input from the reading area setting unit 34 and a result of the setting of the reading area.

Figure 11:
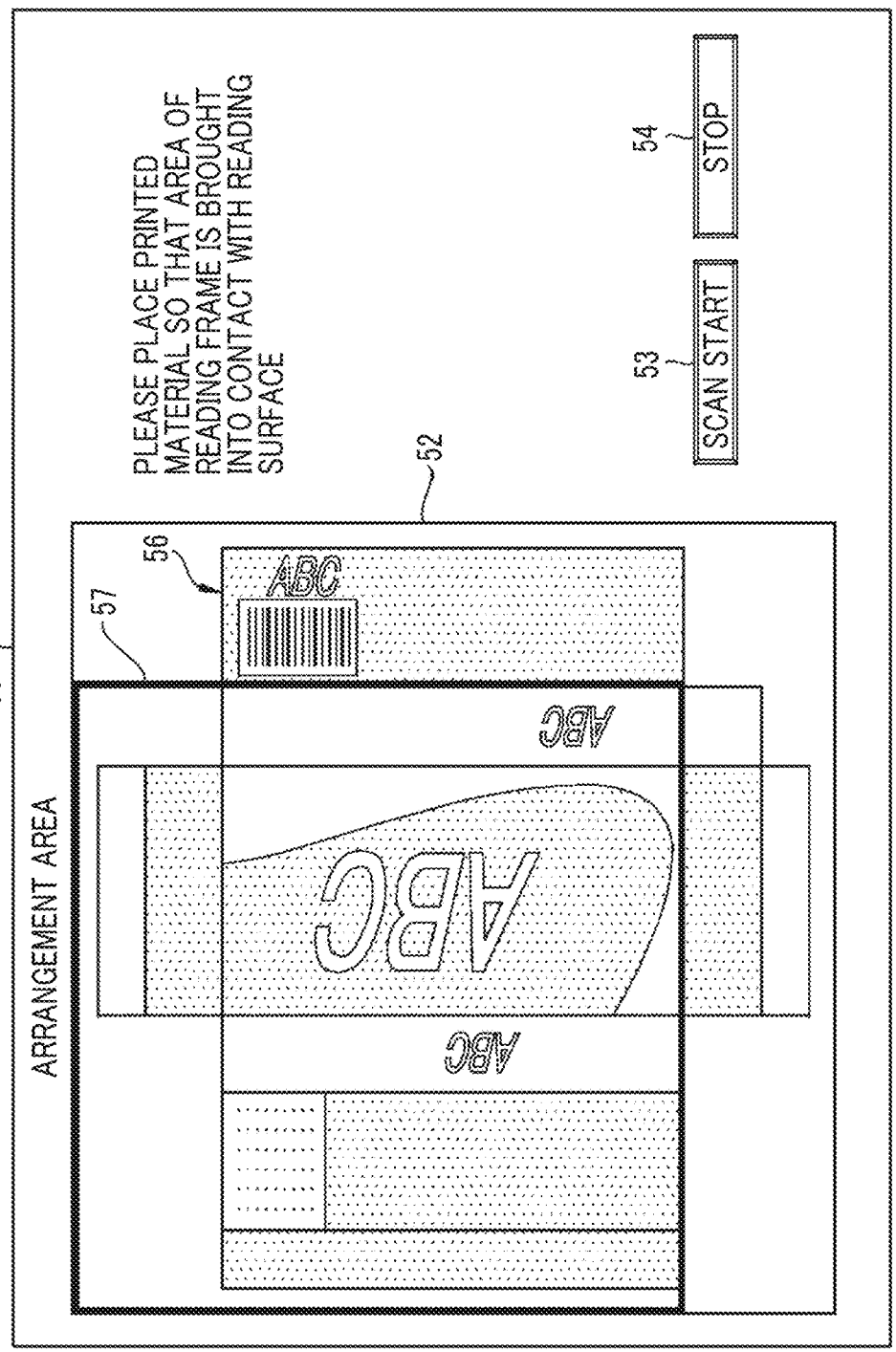
FIG. 11 is a front view of a reading area display screen.

FIG. 11 is a front view of the reading area display screen 50. As illustrated in FIG. 11, the reading area display screen 50 includes an image display field 52, a scan start button 53, a stop button 54, and a message for prompting setting of the printed material 20 in a predetermined position.

In the image display field 52, a reduced image based on reduced image data 56 generated from the manuscript image data 16, and a reading frame 57 indicating a setting position of the printed material 20 with respect to the scanner 12 are displayed.

The display unit 35 generates the reduced image data 56 according to a size of the image display field 52 from the manuscript image data 16, and displays the reduced image based on the reduced image data 56 in the image display field 52. Further, the display unit 35 superimposes the reading frame 57 on the reduced image on the basis of a result of the setting of the reading area and displays these in the image display field 52. Thus, in the reading area display screen 50, the setting position of the printed material 20 with respect to the scanner 12, that is, the reading area of the printed material 20 is indicated to the user.

The scan start button 53 is a button for causes the scanner 12 to start the reading of the printed material 20. If the scan start button 53 is clicked, the scanner 12 performs the reading of the reading area of the printed material 20 to generate read image data 22 (RGB value) of the reading area under the control of the control unit 30. "Click" of the button also includes an operation corresponding to the button, such as touch.

The stop button 54 is a button for causes the scanner 12 to stop the reading of the printed material 20.

As described above, in a case where the reading area setting unit 34 sets a plurality of reading areas, for example, two reading areas, a display of a reading frame 57 corresponding to a first reading area is first performed. Then, after read image data in the first reading area is acquired, a reading frame 57 corresponding to the second reading area is displayed. The same applies a case where three or more reading areas are set.

(Other Examples of Reading Area Display Screen)

Figure 12:
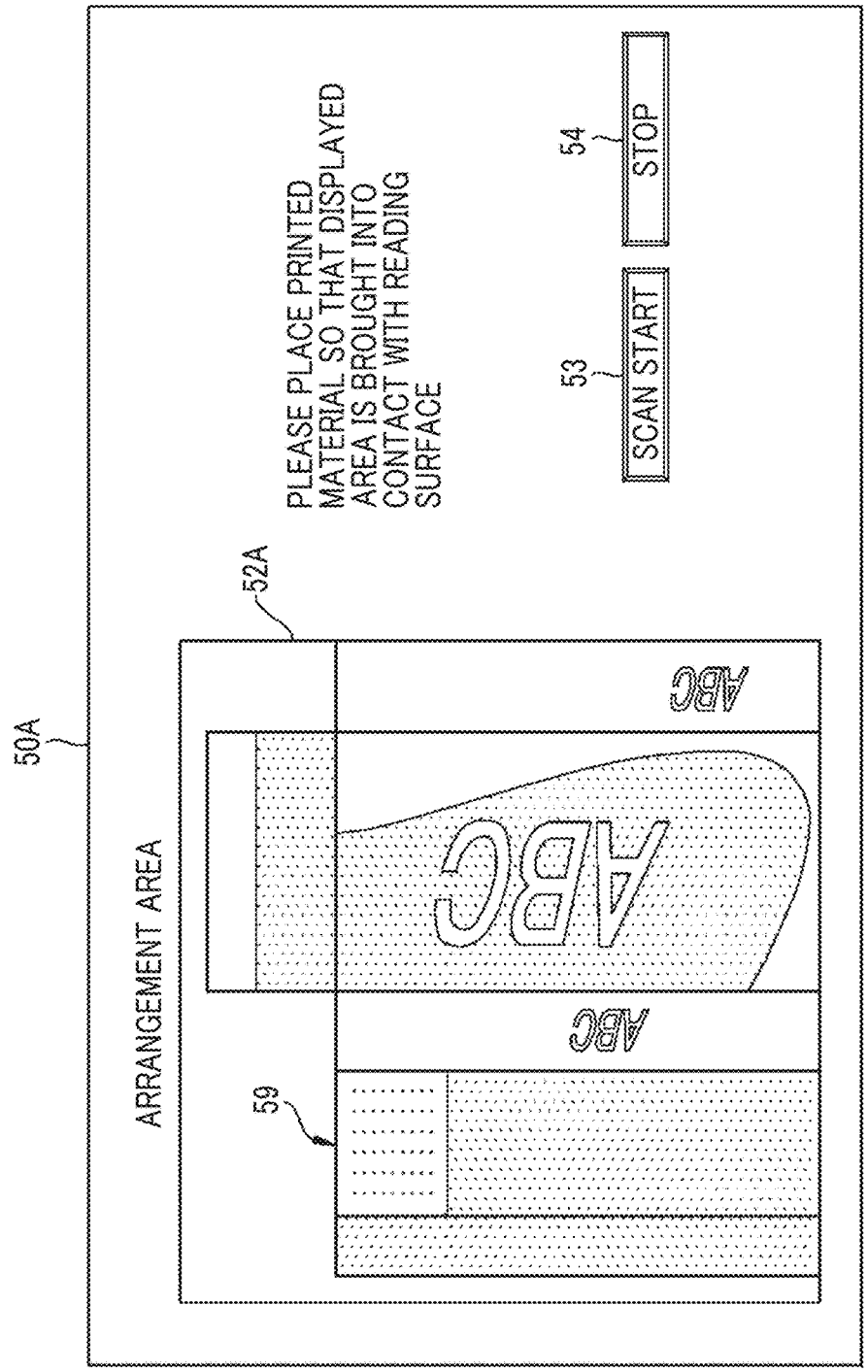
FIG. 12 is a front view of a reading area display screen that is another embodiment of the reading area display screen illustrated in FIG. 11.

FIG. 12 is a front view of a reading area display screen 50A that is another example of the reading area display screen 50 illustrated in FIG. 11. As illustrated in FIG. 12, in the reading area display screen 50A, only an area corresponding to the reading area in the manuscript image based on the manuscript image data 16 is displayed instead of the reduced image based on the reduced image data 56 described above being performed.

The reading area display screen 50A is basically the same as the reading area display screen 50 except that an image display field 52A different from the image display field 52 is included.

In the image display field 52A, an area corresponding to the reading area in the manuscript image based on the manuscript image data 16 is displayed. The display unit 35 selects or cuts out reading area image data 59 corresponding to the reading area from the manuscript image data 16 on the basis of the manuscript image data 16 and a result of the setting of the reading area set by the reading area setting unit 34, and displays a reading area image based on the reading area image data 59 in the image display field 52A. In this case, the reading area image displayed in the image display field 52A indicates the setting position of the printed material 20 with respect to the scanner 12, that is, the reading area of the printed material 20.

<Target Profile Generation Process>

Referring back to FIG. 1, the second image input I/F 36 functions as an image acquisition unit that acquires the read image data 22 generated and output by the scanner 12. Various I/Fs may be used, as in the first image input I/F 32. In this embodiment, the scanner 12 and the second image input I/F 36 are connected by a wired or wireless communication network, and the read image data 22 generated by the scanner 12 is automatically input to the second image input I/F 36. Although the second image input I/F 36 is provided separately from the first image input I/F 32 in this embodiment, both may be integrally formed. The second image input I/F 36 outputs the read image data 22 to the image association unit 39.

The read image data 22 is input from the second image input I/F 36 to the image association unit 39, and the manuscript image data 16 is input from the first image input I/F 32 to the image association unit 39. This image association unit 39 performs association (registration process) between image positions of the manuscript image data 16 in the CMYK color space and the read image data 22 in the RGB color space and performs extraction of the color information from the image area at the corresponding position. Therefore, the image association unit 39 includes an image registration unit 62, and a color extraction unit 63.

The image registration unit 62 performs a registration process of specifying a positional relationship between the manuscript image data 16 and the read image data 22. For this registration process, a known method may be used. For example, a technology described in paragraphs [0064] to [0068] of JP2013-30996A may be used.

Specifically, the image registration unit 62 estimates a geometric correspondence relationship between the manuscript image data 16 and the read image data 22, and performs a geometric conversion process of matching the two pieces of image data on at least one of the two pieces of image data on the basis of the geometrical correspondence relationship. This geometric correspondence relationship includes at least one element among a displacement amount, a rotation angle, and a magnification ratio of the image between the two images to be compared. Further, for the estimation of the geometrical correspondence relationship between the two pieces of image data, for example, a method using a marker, a method using pattern matching, or a method using a phase-only correlation method may be used (see JP2013-30996A).

The color extraction unit 63 extracts color information in units of pixels from the image area at a corresponding position (an image area in which the manuscript image data 16 and the read image data 22 overlap) of the manuscript image data 16 and the read image data 22 after the registration process. Here, the color information extracted in units of pixels from "the image area at the corresponding position" of the manuscript image data 16 by the color extraction unit 63 is a CMYK value, and the color information extracted in units of pixels from the "image area at a corresponding position" of the read image data 22 is an RGB value. Accordingly, correspondence relationship data 67 indicating a correspondence relationship (CMYK-RGB) between the CMYK value of the manuscript image data 16 and the RGB value of the read image data 22 is obtained from the correspondence relationship data 67. The color extraction unit 63 outputs the correspondence relationship data 67 to the color conversion unit 40.

The color conversion unit 40 performs a color conversion process of converting color information in a RGB space of the read image data 22 into color information of a Lab color space using a scanner profile. The scanner profile is a color conversion table showing a correspondence relationship indicating between the RGB value that is a reading image signal value of a device-dependent color space obtained from the scanner 12 and the Lab value of a device-independent color space. The scanner profile is stored in the scanner control device 14 in advance. Through the color conversion process in the color conversion unit 40, correspondence relationship data 69 indicating a correspondence relationship (CMYK-Lab) between the CMYK value and the Lab value of the manuscript image data 16 is obtained from the correspondence relationship data 67. The color conversion unit 40 outputs the correspondence relationship data 69 to the color conversion table generation unit 41.

The color conversion table generation unit 41 generates a color conversion table which defines a conversion relationship (CMYK Lab) for converting the image signal values (CMYK) into a chromaticity value (Lab) on the basis of the correspondence relationship data 69 input from the color conversion unit 40 to generate a target profile 9. Hereinafter, an example of the generation of the target profile 9 in the color conversion table generation unit 41 will be described.

The color conversion table generation unit 41 prepares a "provisional color conversion table" in which smoothness of a color change corresponding to an entire color space is ensured in advance, and locally (partially) modifies the provisional color conversion table using the above-described correspondence relationship data 69.

For the "provisional color conversion table" described herein, for example, in the case of an CMYK input, any one of color conversion tables indicating standard color reproduction in offset printing such as Japan Color (registered trademark), SWOP (Specifications Web Offset Printing), GRACoL (General Requirements for Applications in Commercial Offset Lithography), and Fogra may be used. In the case of RGB input, any one of color conversion tables such as sRGB and AdobeRGB may be used.

Further, the standard color conversion table as described above and the color conversion table generated by the color conversion table generation unit 41 in the past are stored in a database. The color conversion table generation unit 41 may select a color conversion table closest to the correspondence relationship data 69 newly acquired on the basis of the read image data 22 and the manuscript image data 16 of the current printed material 20 from the database, and use this color conversion table as the "provisional color conversion table".

When a color conversion table closest to the correspondence relationship data 69 is selected, the color conversion table generation unit 41 may automatically extract a color conversion table in which an average value of the color difference with this correspondence relationship data 69 is smallest, a color conversion table in which a maximum value of the color difference with the correspondence relationship data 69 is smallest, or the like from the database, and may use the selected color conversion table as "provisional color conversion table". A configuration in which, in a case where a plurality of candidates of the "provisional color conversion table" are extracted through automatic extraction, the candidates are displayed on the display unit 35 and are caused to be selected by the user.

Then, the color conversion table generation unit 41 associates the CMYK value of the correspondence relationship data 69 with a grid point [one or a plurality of (for example, two or four)] of the provisional color conversion table, and replaces the Lab value of the associated grid point with the Lab value of the corresponding correspondence relationship data 69. Since the color conversion table after correction obtained in this manner is obtained by locally replacing a chromaticity value of the grid point with respective to the provisional color conversion table, continuity (smoothness) of the chromaticity value is expected to deteriorate between the grid point of which the chromaticity value has been replaced and the grid point of which the chromaticity value has not been replaced. Therefore, it is preferable for a smoothing process to be further performed on the color conversion table after correction and for smoothness of conversion of the chromaticity value to be ensured. Thus, the color conversion table generation unit 41 generates the color conversion table after correction as the target profile 9.

[Operation of Image Reading Device of First Embodiment]

Next, an operation of the image reading device 10 having the above configuration will be described with reference to FIG. 13. Here, FIG. 13 is a flowchart of a flow (image reading method) of a process of reading the printed material 20 in the image reading device 10 and a process of generating the target profile 9, and particularly, a flow (reading area display method) of a process of displaying the reading area of the printed material 20.

<Reading Area Display Process>

Figure 13:
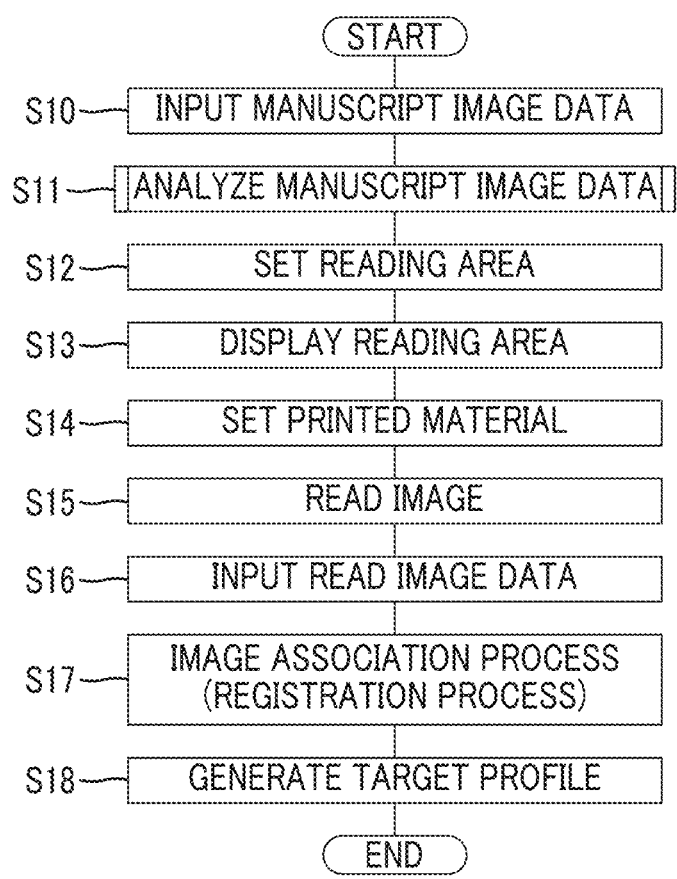
FIG. 13 is a flowchart illustrating a flow of a process of reading a printed material in an image reading device and a process of generating a target profile and, particularly, a flow of a process of displaying a reading area of the printed material.

As illustrated in FIG. 13, original manuscript image data 16 of the printed material 20 is input to the first image input I/F 32 of the scanner control device 14 before reading of the printed material 20 is performed by the scanner 12 (step S10). This manuscript image data 16 is input from the first image input I/F 32 to the image analysis unit 33 and the image association unit 39.

The image analysis unit 33 analyzes the manuscript image data 16 in units of blocks BK, that is, detects the presence or absence, the length, and the position of the straight edge that is a feature shape for each block BK to generate the feature shape image data 45 indicating a result of detection, as described with reference to FIGS. 2 to 6 described above (step S11; corresponding to an image analysis step of the present invention). The image analysis unit 33 outputs the feature shape image data 45 and the manuscript image data 16 to the reading area setting unit 34. The manuscript image data 16 may be directly output from the image analysis unit 33 to the display unit 35 without passing through the reading area setting unit 34.

If the feature shape image data 45 or the like is input to the reading area setting unit 34, the reading area setting unit 34 sets four candidate areas (a first candidate area RA to a fourth candidate area RD) that are candidates of the reading area in the manuscript image data 16, as described with reference to FIGS. 7 to 10 described above. Then, the reading area setting unit 34 counts the number of pieces of valid block image data 45 (OK) in each candidate area, and sets the candidate area in which the count number is largest among the respective candidate areas, as the reading area (step S12; corresponding to a reading area setting step of the present invention). The reading area setting unit 34 outputs a result of the setting of the reading area and the manuscript image data 16 input from the image analysis unit 33 to the display unit 35.

If the result of the setting of the reading area or the like is input to the display unit 35, the display unit 35 displays a reading area display screen 50 on the basis of the manuscript image data 16 and the reading area setting result input from the reading area setting unit 34, as described with reference to FIG. 11 described above. In an image display field 52 of the reading area display screen 50, a reading frame 57 indicating the setting position of the printed material 20 (the reading area of the printed material 20) is displayed to be superimposed on a reduced image based on reduced image data 56 obtained by reducing the manuscript image data 16 (step S13; corresponding to a display step of the present invention). Thus, the setting position of the printed material 20 to be set on the reading surface of the scanner 12, that is, the reading area of the printed material 20 can be indicated to the user. The reading area display screen 50A illustrated in FIG. 12 may be displayed, instead of displaying the reading area display screen 50.

After the setting position of the printed material 20 is displayed on the reading area display screen 50 by the display unit 35, the user sets the reading area of the printed material 20 on the reading surface of the scanner 12 according to the display in the image display field 52 (step S14). Then, if the user operates the operation unit 31 and clicks the scan start button 53, the scanner 12 reads the reading area of the printed material 20 and generates the read image data 22 (RGB value) of the reading area under the control of the control unit 30 (step S15; corresponding to a reading step of the present invention).

<Target Profile Generation Process>

Then, a process of generating the target profile 9 starts in the scanner control device 14.

The read image data 22 (RGB value) generated by the scanner 12 is input from the scanner 12 to the second image input I/F 36 and is also input from the second image input I/F 36 to the image registration unit 62 of the image association unit 39 (step S16).

The image registration unit 62 estimates a geometrical correspondence relationship between the manuscript image data 16 input from the first image input I/F 32 and the read image data 22 input from the second image input I/F 36. The image registration unit 62 performs a geometric conversion process of matching the manuscript image data 16 with the read image data 22 on at least one of the two pieces of image data on the basis of the estimated geometric correspondence relationship. Thus, the registration process of specifying the positional relationship between the manuscript image data 16 and the read image data 22 is performed (step S17).

In this case, the read image data 22 that is a target of the registration process with the manuscript image data 16 is a reading area including a largest number of pieces of valid block image data 45 (OK), that is, read image data 22 obtained by reading the reading area optimal for the registration process in the scanner 12, as described above. Therefore, the registration process in the image registration unit 62 can be accurately executed.

The color extraction unit 63 extracts color information in units of pixels from an image area at a corresponding position of the manuscript image data 16 and the read image data 22 after the registration process, and generates correspondence relationship data 67 indicating a correspondence relationship between color information of the CMYK value of the manuscript image data 16 and color information of the RGB value of the read image data 22. The color extraction unit 63 outputs the generated correspondence relationship data 67 to the color conversion unit 40.

The color conversion unit 40 performs a color conversion process of converting color information in a RGB space of the read image data 22 into color information of a Lab color space using a scanner profile corresponding to a type of scanner 12 to generate the correspondence relationship data 69 indicating a correspondence relationship between the CMYK value and the Lab value of the manuscript image data 16 from the correspondence relationship data 67. The color conversion unit 40 outputs the correspondence relationship data 69 to the color conversion table generation unit 41.

The color conversion table generation unit 41 locally modifies the above-described provisional color conversion table, which has been prepared in advance, using the correspondence relationship data 69 input from the color conversion unit 40 to generate a target color conversion table after the modification as the target profile 9 (step S18).

Effects of First Embodiment

As described above, in the image reading device 10 of the first embodiment, since the reading area suitable for the above-described registration process in the manuscript image data 16 is automatically set and the setting position of the printed material 20 with respect to the scanner 12 is displayed on the basis of the result of the setting, an appropriate reading area of the printed material 20 can be indicated to the user. Accordingly, it is not necessary for the reading to be repeated several times by the scanner 12 while changing the reading area of the printed material 20, and reading of the reading area suitable for the registration process can be performed in a short time (about once). Further, even in a case where a position of a primary subject (a product, a person, or the like) suitable for the registration process is different according to printed materials, it is possible to display the reading area that matches the printed material. As a result, particularly, when the reading of the printed material 20 larger than the reading range of the scanner 12 is performed by the scanner 12, it is possible to efficiently perform the reading of the printed material 20.

[Image Reading Device of Second Embodiment]

Next, an image reading device of a second embodiment will be described. Since the image reading device of the second embodiment has basically the same configuration as that of the image reading device 10 in the first embodiment, units that are the same in function and configuration as in the first embodiment are denoted with the same reference numerals and a description thereof will be omitted (see FIG. 1).

The image reading device of the second embodiment is different from the image reading device 10 of the first embodiment in the method of setting the reading area in the reading area setting unit 34. Further, in the image reading device of the second embodiment, manuscript image data 16A different from the manuscript image data 16 of the first embodiment is used.

Figure 14A:
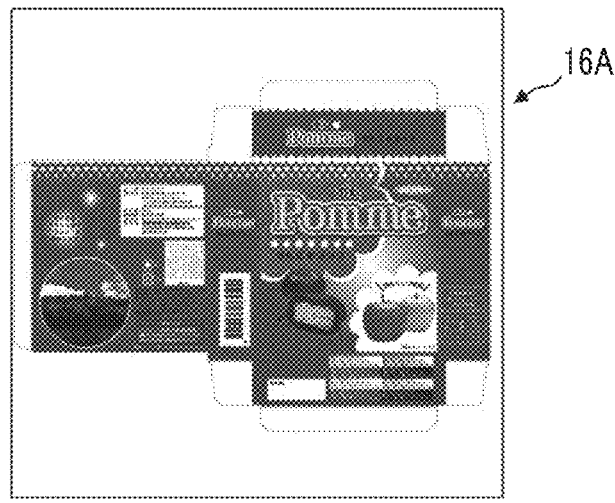
FIGS. 14A to 14C are illustrative diagrams illustrating a process of analyzing manuscript image data in an image analysis unit of a second embodiment.
Figure 14B:
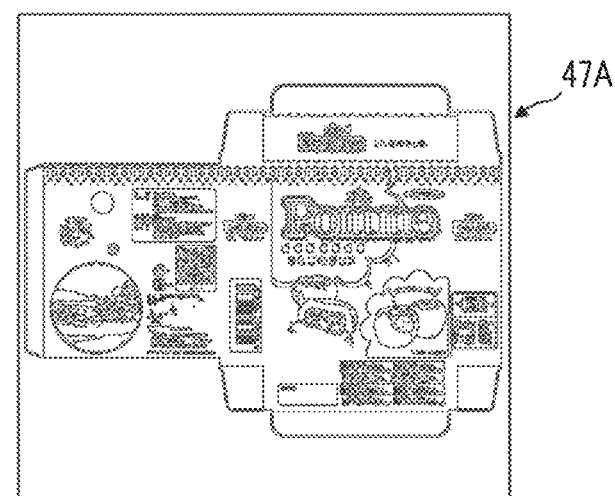
Figure 14C:
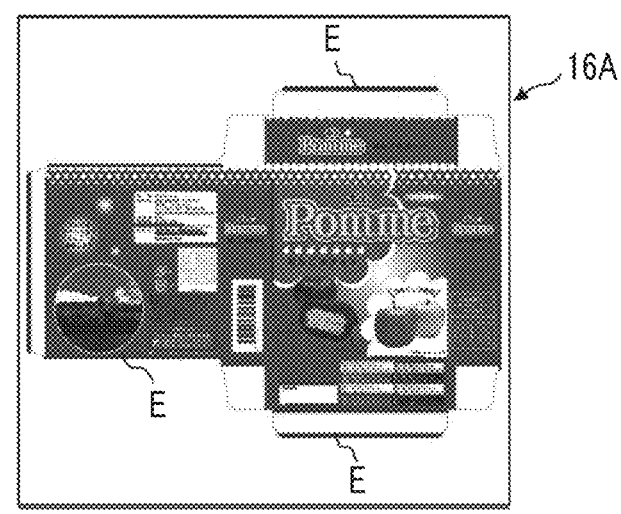

FIGS. 14A to 14C are illustrative diagrams illustrating a process of analyzing the manuscript image data 16A in the image analysis unit 33 of the second embodiment. In FIGS. 14A to 14C, a frame line indicating the block BK (see FIG. 3) is not illustrated in order to prevent FIGS. 14A to 14C from being complicated.

The image analysis unit 33 of the second embodiment performs a luminance image conversion process in units of blocks BK, an edge image generation process, and a feature shape detection process on the manuscript image data 16A illustrated in FIG. 14A, as in the first embodiment. Thus, edge image data 47A is generated from the manuscript image data 16A as illustrated in FIG. 14B, and then, the straight edge E that is the feature shape is detected from the edge image data 47A, as illustrated in FIG. 14C. In FIG. 14C, the edge E is displayed as a thick line on the manuscript image data 16A. Feature shape image data 45A (see FIGS. 15A and 15B) indicating a result of the detection of presence or absence, a length, and a position of the straight edge of each block BK is generated by the image analysis unit 33.

Figure 15A:
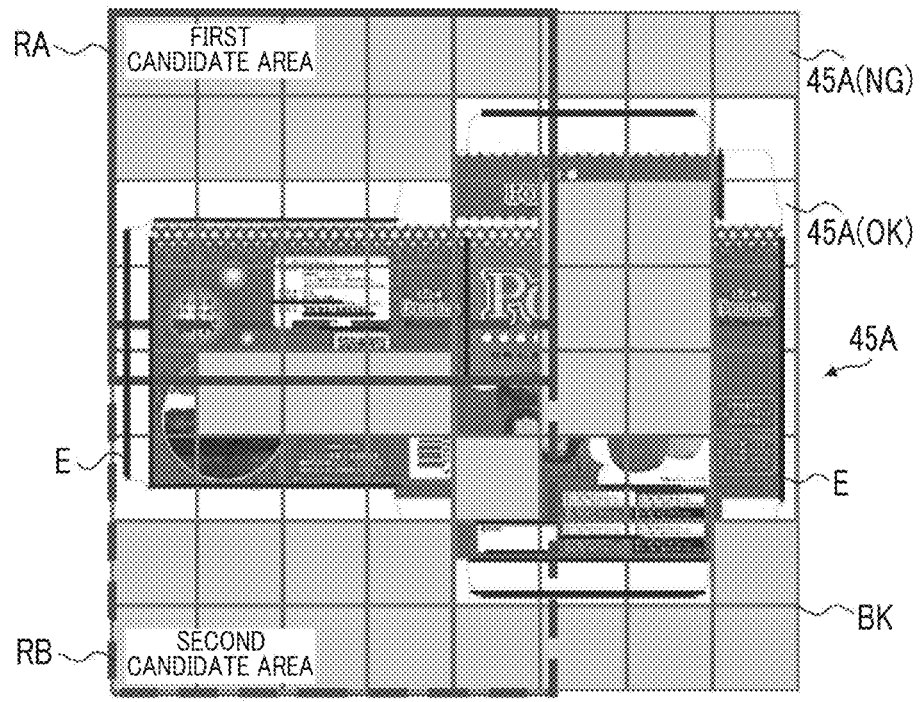
FIGS. 15A and 15B are illustrative diagrams illustrating feature shape image data, and a process of setting a reading area in the second embodiment.
Figure 15B:
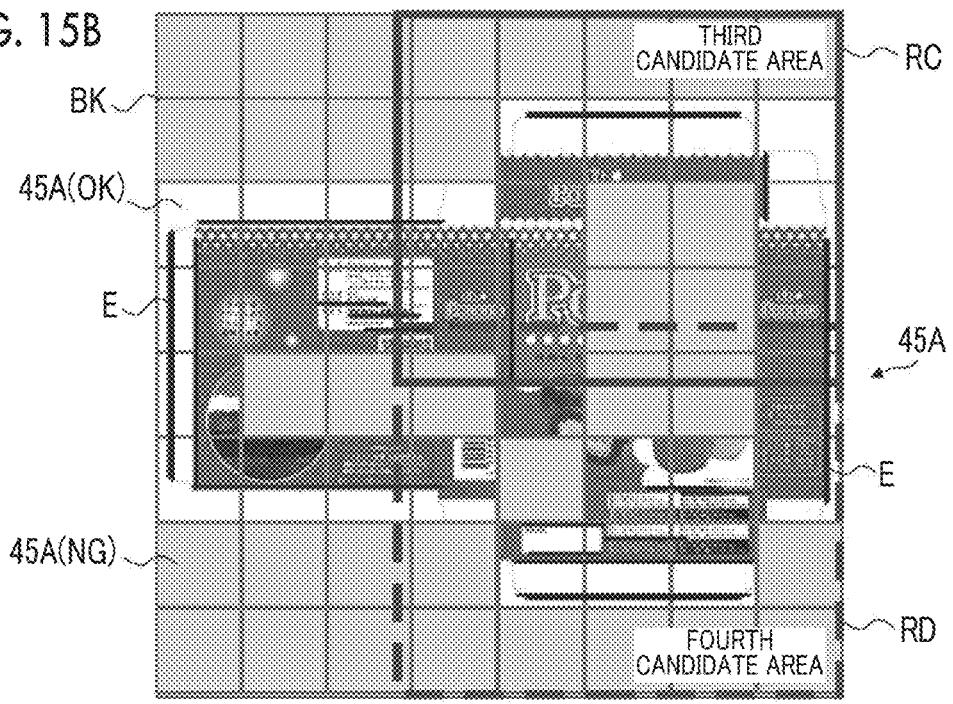

FIGS. 15A and 15B are illustrative diagrams illustrating the feature shape image data 45A, and a process of setting the reading area in the second embodiment. As illustrated in FIGS. 15A and 15B, the feature shape image data 45A is divided in unit of blocks BK, similar to the feature shape image data 45 of the first embodiment. This feature shape image data 45A includes valid block image data 45A (OK) and invalid block image data 45A (NG). In FIGS. 15A and 15B, the invalid block image data 45A (NG) is displayed by gray.

The reading area setting unit 34 of the second embodiment sets the first candidate area RA to the fourth candidate area RD (a maximum reading size of the scanner 12) in contact with the outer periphery of the image, in the feature shape image data 45A, using four corners of the image based on the feature shape image data 45A as start points, as in the first embodiment. Then, the reading area setting unit 34 detects the number of the straight edges E included in the valid block image data 45A (OK) in the candidate area and lengths of the edges E, in each of the first candidate area RA to the fourth candidate area RD. On the basis of a result of this detection, the reading area setting unit 34 performs setting of the reading area by obtaining any one of first edge totaling data 100, second edge totaling data 101, and third edge totaling data 102 (see FIGS. 16A to 16C) to be described below. The one of the edge totaling data 100 to 102 to be obtained can be selected in the operation unit 31 by the user.

FIG. 16A is an illustrative diagram illustrating an example of the first edge totaling data 100. FIG. 16B is an illustrative diagram illustrating an example of the second edge totaling data 101. FIG. 16C is an illustrative diagram illustrating an example of the third edge totaling data 102.

As illustrated in FIG. 16A, the number of pieces of valid block image data 45A (OK) including the edge E is registered for each of the candidate areas RA to RD in the first edge totaling data 100. The reading area setting unit 34 counts the number of pieces of valid block image data 45A (OK) including the straight edge E for each of the candidate areas RA to RD on the basis of a result of the detection of the straight edge E in the above-described image analysis unit 33, and registers the number in the first edge totaling data 100. The reading area setting unit 34 sets the candidate area in which the count number is largest among the candidate areas RA to RD as the reading area by referring to the first edge totaling data 100. Here, the first candidate area RA is set as the reading area.

As illustrated in FIG. 16B, the number of pieces of valid block image data 45A (OK) in which the edge E having a maximum length in each candidate area straddles is registered in the second edge totaling data 101 for each of the candidate areas RA to RD. The reading area setting unit 34 counts the number of successive pixels of the edge image data 47A obtained by the above-described image analysis unit 33 to detect the length of each edge E in each candidate area. Then, the reading area setting unit 34 counts the number of pieces of valid block image data 45A (OK) in which the edge E having a maximum length straddles for each of the candidate areas RA to RD and registers the number in the second edge totaling data 101. The reading area setting unit 34 sets the candidate area in which the count number is largest among the candidate areas RA to RD as the reading area by referring to the second edge totaling data 101. In FIGS. 15A and 15B described above, it is difficult to discriminate the straight edges E for convenience of creation of drawings, but the count number of the second candidate area RB is "5" that is a maximum, and the second candidate area RB is set as the reading area.

As illustrated in FIG. 16C, the number of edges E in the valid block image data 45A (OK) including a largest number of edges E is registered in the third edge totaling data 102 for each of the candidate areas RA to RD. The reading area setting unit 34 detects the valid block image data 45A (OK) including the largest number of edges E in each candidate area on the basis of a result of the detection of the straight edge E in the above-described image analysis unit 33. Then, the reading area setting unit 34 counts the number of edges E in the detected valid block image data 45A (OK) for each candidate area and registers the number in the third edge totaling data 102. The reading area setting unit 34 sets the candidate area in which the count number is largest among the candidate areas RA to RD as the reading area by referring to the third edge totaling data 102. In FIGS. 15A and 15B described above, it is difficult to discriminate the straight edges E for convenience of creation of drawings, but the count number of edges E in the valid block image data 45A (OK) of the fourth candidate area RD is "5" that is a maximum, and the fourth candidate area RD is set as the reading area.

Thus, the reading area setting unit 34 performs setting of the reading area, and then, outputs a result of the setting of the reading area and the manuscript image data 16 to the display unit 35. Since subsequent processes are essentially the same as in the first embodiment, detailed description thereof will be omitted herein.

In the image reading device of the second embodiment, since the reading area is automatically set in the manuscript image data 16 and a setting position of the printed material 20 with respect to the scanner 12 is displayed on the basis of a result of the setting, the same effects as in the first embodiment are obtained.

[Program Causing Computer to Function as Means for Displaying Reading Area of Printed Material]

A program causing a computer to function as the image reading device (reading area display device) described in the above-described embodiment can be recorded in a CD-ROM, a magnetic disk, or another computer-readable medium (non-transitory computer-readable tangible medium) and provided through the medium. Instead of an aspect in which the program is stored in such an information storage medium and provided, a program signal can be provided as a download service using a communication network such as the Internet.

Further, by incorporating the program into a computer, the computer is caused to realize each function of the image reading device (reading area display device), and a display of the reading area described in the above-described embodiment can be realized. Further, an aspect in which a portion or all of the program is incorporated into a host computer connected to the scanner 12 via a communication network, or an aspect in which a portion or all of the program is applied as an operating program of a CPU of the scanner 12 are also possible.

[Others]

Although the reading of the reading area of the printed material 20 is performed using the scanner 12 in each embodiment described above, various reading units capable of reading an image printed on the printed material 20, such as a camera, may be used.

Although the example in which the scanner and the scanner control device are separately provided has been described in each embodiment, the scanner and the scanner control device may be integrally formed.

Although the setting position of the printed material 20 with respect to the scanner 12 is indicated to the user by the reading area display screen 50 or 50A displayed on the display unit 35 in each embodiment described above, a message indicating the setting position of the printed material 20, for example, may be displayed on the display unit 35. This message is not particularly limited as long as the user understands the setting position of the printed material 20, and an example thereof is "Please align an upper left corner of the printed material with an upper left corner of the reading surface of the scanner". Further, the message may be indicated as sound to the user using a speaker or the like. In this case, sound indication of the speaker or the like functions as a display unit of the present invention.

Although the case where the straight edge is detected as the feature shape from the manuscript image data 16 has been described by way of example in each embodiment described above, the feature shape is not limited to the straight edge as long as the feature shape is suitable for the registration process of specifying a positional relationship between the manuscript image data 16 and the read image data 22.

Figure 17:
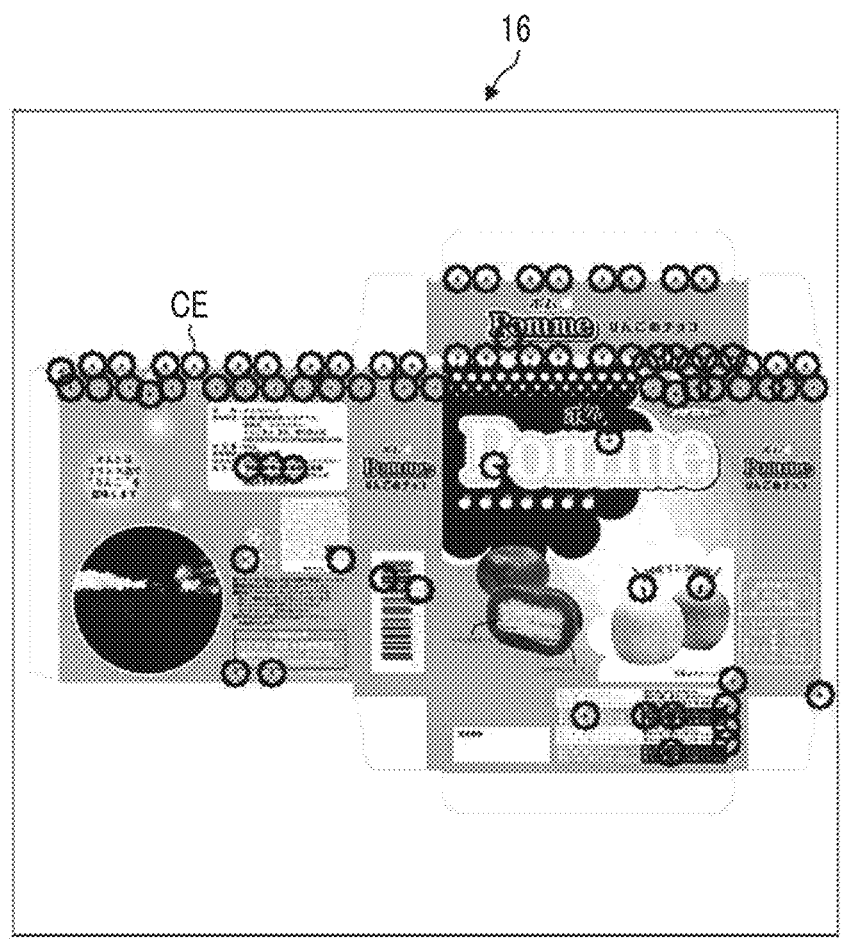
FIG. 17 is an illustrative diagram illustrating an example in which detection of a feature shape other than a straight edge is performed.

FIG. 17 is an illustrative diagram illustrating an example in which detection of the feature shape other than the straight edge is performed. As illustrated in FIG. 17, the image analysis unit 33 detects a corner CE as the feature shape from the edge image data 47 (the manuscript image data 16 is displayed for ease of understanding in FIG. 17), for example, using a corner detection method of Harris. Further, a circle may be detected as a feature shape from the edge image data 47, for example, using a circle detection method using Hough transformation, instead of performing the corner detection. Here, in the corner detection or the circle detection, it is easy to detect a fine structure in comparison with the detection of the straight edge. Therefore, it is preferable for the straight edge to be detected as the feature shape that is used in the registration process described above, but even when the corner detection or the circle detection is performed, there is no particular problem in the above-described registration process.

Although the feature shape such as the straight edge is detected as the feature amount of the manuscript image data 16 and the setting of the reading area based on a result of the detection is performed in each embodiment described above, the feature amount to be used in the registration process between the manuscript image data 16 and the read image data 22 may be detected without performing the edge detection. Specifically, a case where the registration process is performed using another registration algorithm such as SIFT (Scale-Invariant Feature Transform, proposed by David Lowe, see U.S. Pat. No. 6,711,293) may be included as an example. In this case, a feature point that is used by the registration algorithm may be detected from manuscript image data and a reading area may be set from a distribution (the number of blocks including feature points in a candidate area, or a density thereof) of feature points using the feature point as a feature amount. Here, the density is the number of feature points in the block.

Although the four candidate areas are set in the feature shape image data using the four corners of the image based on the feature shape image data as respective start points in each embodiment above, the candidate area may be set at an image central portion as long as interference with a top place of the scanner 12 is not caused when the printed material 20 is set on the scanner 12.

Although the example of the reading area display screen 50 or 50A indicating the setting position of the printed material 20 with respect to the scanner 12 is illustrated in FIGS. 11 and 12 in each embodiment described above, the setting position when the printed material 20 is viewed from the back surface may be displayed on the reading area display screen in a case where the printed surface of the printed material 20 is arranged on the reading surface of the scanner 12 in an overlapping manner. In this case, a display mode of the image based the manuscript image data 16 or the reading area image data 59 when viewed from the back surface side of the printed material 20 may be changed into a dotted line display or the like so that the user can understand the setting position when viewed from the back surface side of the printed material 20.

Further, the present invention is not limited to the above-described embodiments and it is understood that various modifications can be performed without departing from the spirit of the present invention. For example, at least two of the above-described embodiments may be appropriately combined.

EXPLANATION OF REFERENCES

10: image reading device
12: scanner
14: scanner control device
16: manuscript image data
20: printed material
22: read image data
33: image analysis unit
34: reading area setting unit
35: display unit
39: image association unit
45: feature shape image data
62: image registration unit
63: color extraction unit

What is claimed is:

1. An image reading device, comprising:
   a reading unit that, via an imaging device, performs reading of a printed material on which an image is printed on the basis of manuscript image data;

an image acquisition unit that, via a processor, acquires the manuscript image data from an outside of the image reading device;

an image analysis unit that, via the processor, analyzes the manuscript image data and detects a feature amount to be used for specifying a positional relationship between the manuscript image data and read image data of the printed material read by the reading unit;

a reading area setting unit that, via the processor, sets a reading area in which the reading unit performs reading of the printed material, on the basis of the feature amount detected by the image analysis unit, and sets at least one or more areas including the feature amount in the manuscript image data as the reading area; and a display unit that, via a display, displays a setting position of the printed material with respect to the reading unit on the basis of a result of the setting of the reading area by the reading area setting unit, wherein the reading unit performs reading of the printed material set in the reading unit after the setting position is displayed by the display unit.

2. The image reading device according to claim 1, wherein the reading unit performs reading of the printed material that is larger than a reading range in which the reading unit is capable of reading the printed material.

3. The image reading device according to claim 1, wherein the display unit displays the setting position to be overlapped on a reduced image generated on the basis of the manuscript image data.

4. The image reading device according to claim 1, wherein the display unit selects and displays an area corresponding to the reading area in an image based on the manuscript image data.

5. The image reading device according to claim 1, wherein the image analysis unit analyzes edge image data generated on the basis of the manuscript image data, and detects a feature shape of the image to be used for specifying the positional relationship as the feature amount from the edge image data.

6. The image reading device according to claim 5, wherein the image analysis unit detects a straight edge as the feature shape.

7. The image reading device according to claim 1, wherein the reading area setting unit sets a plurality of candidate areas that are candidates of the reading area in the manuscript image data, and sets an area including at least the feature amount detected by the image analysis unit among the plurality of the candidate area, as the reading area.

8. The image reading device according to claim 7, wherein the reading area setting unit sets an area including the most feature amount detected by the image analysis unit among the plurality of candidate areas as the reading area.

9. The image reading device according to claim 1, further comprising:
   a registration unit that, via the processor, performs a registration process of specifying a positional relationship between the read image data read by the reading unit and the manuscript image data after reading of the printed material in the reading unit; and
   a color extraction unit that, via the processor, acquires color information from a corresponding image position of the read image data and the manuscript image data and obtains a correspondence relationship between color information of the read image data and color information of the manuscript image data.

10. The image reading device according to claim 1, wherein the reading area is separate from the manuscript data.

11. The image reading device according to claim 1, wherein the reading area is only on the printed material.

12. An image reading method of performing reading of a printed material using a reading unit that performs reading of a printed material on which an image is printed on the basis of manuscript image data, the image reading method comprising:
    analyzing the manuscript image data and detecting a feature amount to be used for specifying a positional relationship between the manuscript image data and read image data of the printed material read by the reading unit;
    acquiring the manuscript image data from an outside of the image reading device;
    setting a reading area in which the reading unit performs reading of the printed material, on the basis of the feature amount detected in the image analysis step, and setting at least one or more areas including the feature amount in the manuscript image data as the reading area;
    displaying a setting position of the printed material with respect to the reading unit on the basis of a result of the setting of the reading area in the setting; and
    performing reading of the printed material set in the reading unit after the setting position is displayed in the displaying.

13. A reading area display device that displays a reading area of a printed material when reading of the printed material is performed by a reading unit that, via an imaging device, performs reading of a printed material on which an image is printed on the basis of manuscript image data, the reading area display device comprising:
    an image acquisition unit that, via a processor, acquires the manuscript image data from an outside of the image reading device;
    an image analysis unit that, via the processor, analyzes the manuscript image data and detects a feature amount to be used for specifying a positional relationship between the manuscript image data and read image data of the printed material read by the reading unit;
    a reading area setting unit that, via the processor, sets a reading area in which the reading unit performs reading of the printed material, on the basis of the feature amount detected by the image analysis unit, and sets at least one or more areas including the feature amount in the manuscript image data as the reading area; and
    a display unit that, via a display, displays a setting position of the printed material with respect to the reading unit on the basis of a result of the setting of the reading area by the reading area setting unit.

14. A reading area display method of displaying a reading area of a printed material when reading of the printed material is performed by a reading unit that performs reading of a printed material on which an image is printed on the basis of manuscript image data, the reading area display method comprising:
    acquiring the manuscript image data from an outside of the image reading device;
    analyzing the manuscript image data and detecting a feature amount to be used for specifying a positional relationship between the manuscript image data and read image data of the printed material read by the reading unit;

setting a reading area in which the reading unit performs reading of the printed material, on the basis of the feature amount detected in the image analysis step, and setting at least one or more areas including the feature amount in the manuscript image data as the reading area; and setting position of the printed material with respect to the reading unit on the basis of a result of the setting of the reading area in the setting.

15. A computer-readable tangible medium having a program for causing a computer to function for displaying a reading area of a printed material when reading of the printed material is performed by a reading unit that performs reading of the printed material on which an image is printed on the basis of manuscript image data, the program causing the computer to function as:

an image acquisition unit that acquires the manuscript image data from an outside of an image reading device;

an image analysis unit that analyzes the manuscript image data and detects a feature amount to be used for specifying a positional relationship between the manuscript image data and read image data of the printed material read by the reading unit;

a reading area setting unit that sets a reading area in which the reading unit performs reading of the printed material, on the basis of the feature amount detected by the image analysis unit, and sets at least one or more areas including the feature amount in the manuscript image data as the reading area; and a display unit that displays a setting position of the printed material with respect to the reading unit on the basis of a result of the setting of the reading area by the reading area setting unit.

* * * * *